(12) United States Patent
Yamashita

(10) Patent No.: US 12,469,871 B2
(45) Date of Patent: Nov. 11, 2025

(54) STACKED CELL MANUFACTURING DEVICE

(71) Applicant: KYOTO SEISAKUSHO CO., LTD., Kyoto (JP)

(72) Inventor: Manabu Yamashita, Kyoto (JP)

(73) Assignee: Kyoto Seisakusho Co., Ltd, Kyoto (JP)

( * ) Notice: Subject to any disclaimer, the term of this patent is extended or adjusted under 35 U.S.C. 154(b) by 493 days.

(21) Appl. No.: 18/005,061

(22) PCT Filed: Jul. 13, 2021

(86) PCT No.: PCT/JP2021/026292
§ 371 (c)(1),
(2) Date: Jan. 11, 2023

(87) PCT Pub. No.: WO2022/014590
PCT Pub. Date: Jan. 20, 2022

(65) Prior Publication Data
US 2023/0318015 A1    Oct. 5, 2023

(30) Foreign Application Priority Data
Jul. 14, 2020   (JP) .................................. 2020-120964

(51) Int. Cl.
*H01M 10/04* (2006.01)
(52) U.S. Cl.
CPC ... *H01M 10/0459* (2013.01); *H01M 10/0404* (2013.01); *Y10T 29/53135* (2015.01)
(58) Field of Classification Search
CPC ......... H01M 10/0459; H01M 10/0404; H01M 10/045; H01M 50/46; Y10T 29/53135
USPC ................................ 29/730, 623.1, 729, 731
See application file for complete search history.

(56) References Cited

U.S. PATENT DOCUMENTS

| 9,899,707 B2 * | 2/2018 | Kim ................. H01M 10/0525 |
| 2014/0237808 A1 | 8/2014 | Nakakuki et al. |
| 2015/0129107 A1 * | 5/2015 | Miyazaki ............ B32B 38/1841 156/522 |

FOREIGN PATENT DOCUMENTS

JP    2014-165055 A    9/2014

OTHER PUBLICATIONS

International Search Report (with partial translation) dated Sep. 28, 2021, issued in corresponding International Patent Application No. PCT/JP2021/026292.

* cited by examiner

*Primary Examiner* — Thiem D Phan
(74) *Attorney, Agent, or Firm* — Morgan, Lewis & Bockius LLP

(57) ABSTRACT

After stacking of stacked cell is finished, the control unit performs a cutting process including allowing a separator cutting unit to cut a separator between a separator holding unit and a table for stacking in a state where the separator holding unit holds a lower surface of the separator between a separator roller and the table for stacking, moving the separator holding unit from below the separator roller to one side, and allowing to pass the separator to an upper surface of the table for stacking that has moved to the one side after the completed stacked cell is removed.

6 Claims, 29 Drawing Sheets

STACKED CELL MANUFACTURING DEVICE

TECHNICAL FIELD

The present invention relates to a stacked cell manufacturing device.

BACKGROUND ART

As batteries for vehicles or electronic devices, or other various batteries, a stacked type battery is widely adopted, in which negative electrode plates and positive electrode plates are alternately stacked with a separator therebetween. JP-A-2014-165055 describes a structure in which a positive electrode plate transfer head and a negative electrode plate transfer head alternately press the separator to fold it in a zigzag manner, and transfers the positive electrode plate to the folded separator from the positive electrode plate transfer head, while transfers the negative electrode plate to the folded separator from the negative electrode plate transfer head, so that the positive electrode plates and the negative electrode plates are alternately stacked with a separator therebetween.

LIST OF CITATIONS

Patent Literature

Patent Document 1: JP-A-2014-165055

SUMMARY OF THE INVENTION

Technical Problem

In the structure of JP-A-2014-165055, after a stacked body is completed, it is necessary to move a table that holds the stacked body in a direction different from a direction when bending in alternating direction like a body rotating about a lateral axis so as to move while avoiding a standby stage for the positive electrode plate. The movement in this direction may cause unstable tension of the separator.

Accordingly, it is an object of the present invention to provide a stacked cell manufacturing device that can stably manufacture high quality stacked cells.

Means for Solving the Problem

In order to achieve the object described above, a stacked cell manufacturing device of the present invention manufactures a stacked cell in which negative electrode plates and positive electrode plates are alternately disposed and stacked in valley fold parts of a bellows-shaped folded separator. The stacked cell manufacturing device includes: a separator feed unit having a separator roller; a folding unit including a table for stacking that holds the separator and moves in a reciprocating manner between one side and the other side with respect to the separator roller, so as to fold the separator in a bellows shape; an electrode feed unit arranged to feed the negative electrode plates and the positive electrode plates alternately to the separator folded in the bellows shape by the folding unit; a separator holding unit arranged to hold the separator fed from the separator roller; a separator cutting unit arranged to cut the separator held by the separator holding unit; and a control unit. Stacking of the stacked cell is finished when the table for stacking is on the other side. After the stacking of the stacked cell is finished, the control unit performs a cutting process including allowing the separator cutting unit to cut the separator between the separator holding unit and the table for stacking in a state where the separator holding unit holds a lower surface of the separator between the separator roller and the table for stacking, moving the separator holding unit from below the separator roller to the one side to be a standby state, and then allowing to pass the separator to an upper surface of the table for stacking when the completed stacked cell is removed and the table for stacking moves to the one side.

With this structure, it is possible to cut the separator in a state where stacking of the stacked cell is being performed. In this way, without performing a special operation by the folding unit, a variation in tension of the separator can be suppressed. In this way, high quality stacked cells can be manufactured stably.

In the structure described above, the separator holding unit absorbs and holds the separator.

In the structure described above, the electrode feed unit includes two electrode plate feed units, and one of the electrode plate feed units is disposed on the one side so as to feed the electrode plate to be the negative electrode plate, while the other electrode plate feed unit is disposed on the other side so as to feed the electrode plate to be the positive electrode plate.

In the structure described above, the folding unit includes an imaging unit for checking that takes an image of the table for stacking on which the electrode plate is placed, and after the cutting process is finished, the control unit moves the separator holding unit out of an imaging range of the imaging unit for checking to be on standby.

In the structure described above, the separator feed unit includes a separator conveying unit capable of attaching two separator rolls in which the separator is wound in a roll, so as to convey the separator pulled out from one of the separator rolls to the separator roller, a separator remaining amount detector to detect a remaining amount of the separator roll from which the separator is currently being pulled out, and a connecting unit disposed at a middle part of the separator conveying unit, so as to cut the separator being pulled out from the current separator roll and to connect the separator pulled out from the remaining separator roll to the rear end of the separator currently being conveyed, when the remaining amount of the separator roll detected by the separator remaining amount detector becomes a certain amount or less. The control unit controls the connecting unit to connect the separators so that a joint part of the separators does not reach the stacked cell, when stacking of the stacked cell that is currently being stacked is finished.

In the structure described above, after the separators are connected by the connecting unit, and after the completed stacked cell is removed, the control unit performs a joint part ejection process including stopping operation of the electrode feed unit, driving the separator feed unit and the folding unit until the bellows-shaped separator on the table for stacking includes the joint part, controlling the separator cutting unit to cut the separator while holding the separator with the separator holding unit, and ejecting a separator folded body formed on the table for stacking.

Advantageous Effects of the Invention

According to the present invention, it is possible to provide a stacked cell manufacturing device that can stably manufacture high quality stacked cells.

DESCRIPTION OF EMBODIMENTS

Hereinafter an embodiment of the present invention is described with reference to the drawings.

Stacked Cell Manufacturing Device 100

Figure 1:
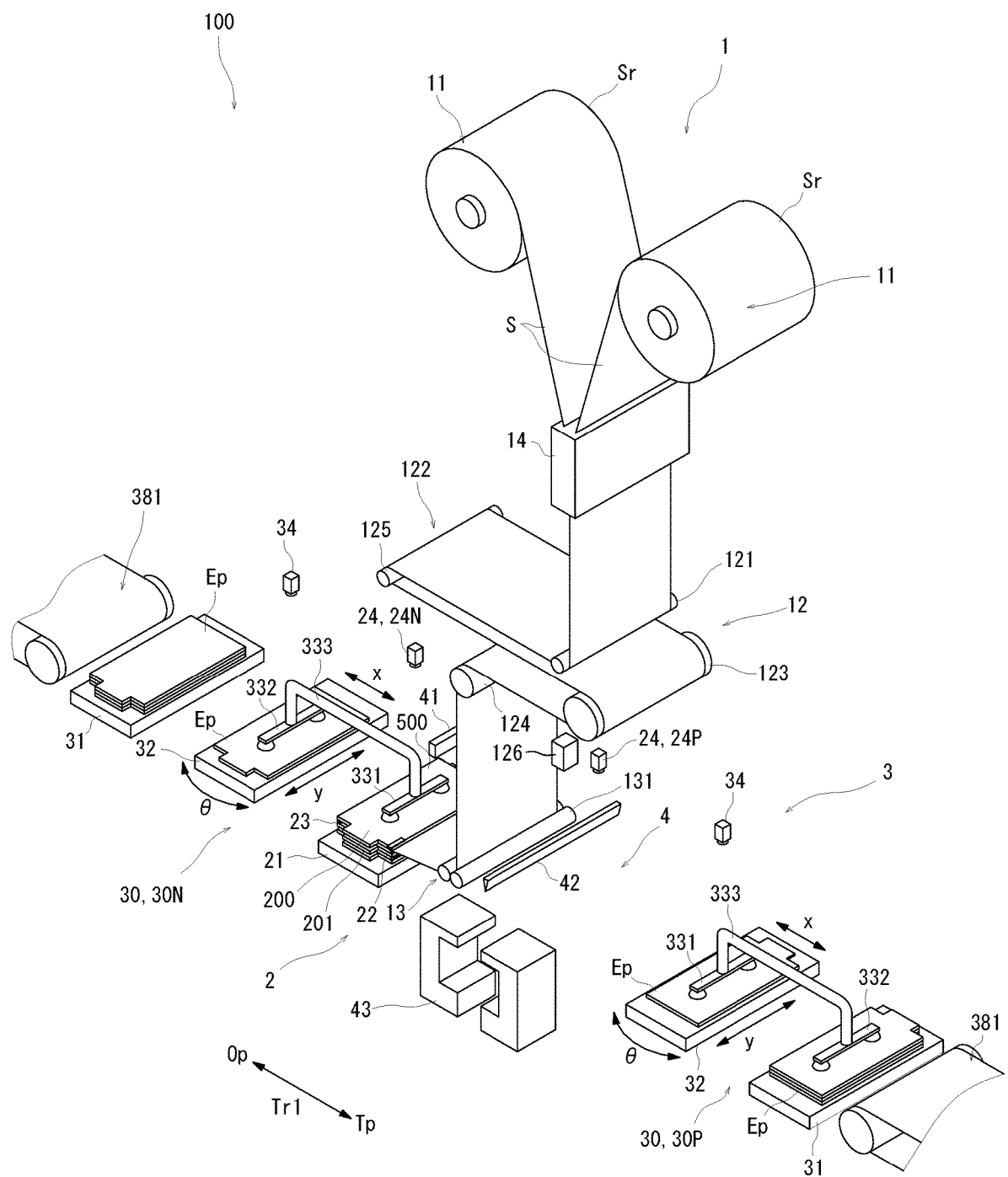
FIG. 1 is a schematic layout diagram of a stacked cell manufacturing device according to the present invention.
Figure 2:
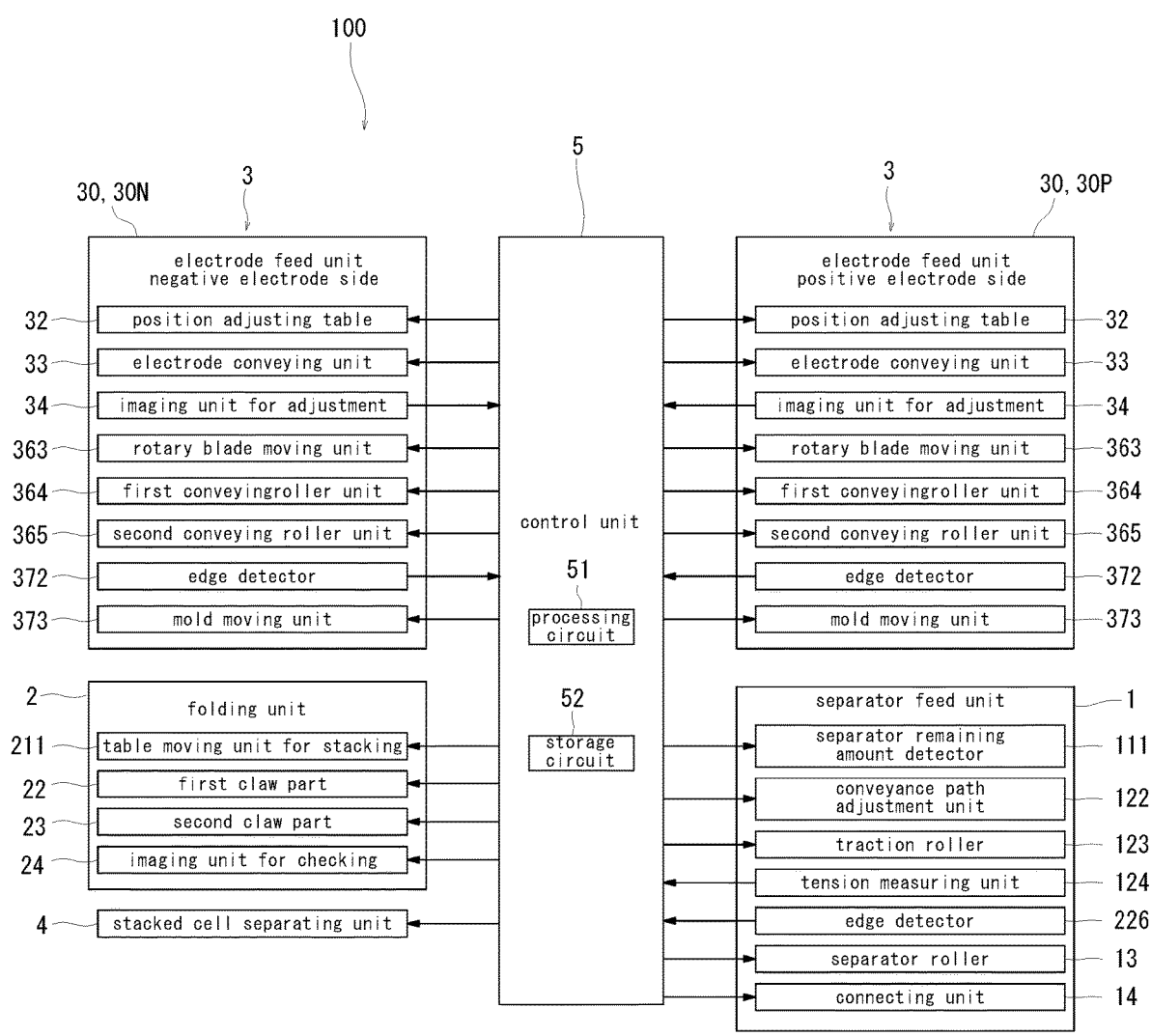
FIG. 2 is a functional block diagram of the stacked cell manufacturing device.

FIG. 1 is a schematic layout diagram of a stacked cell manufacturing device 100 according to the present invention. FIG. 2 is a functional block diagram of the stacked cell manufacturing device 100. Note that in the stacked cell manufacturing device 100 of this embodiment, movement direction Tr1 of a table for stacking 21 is shown by an arrow in the stacked cell manufacturing device 100 illustrated in FIG. 1.

In the movement direction Tr1 of the table for stacking 21, the left side from a roller pair 131 described later is referred to as one side Op, while the right side from the same is referred to as the other side Tp. The table for stacking 21 moves linearly in a reciprocating manner, for example, between the one side Op and the other side Tp. When the table for stacking 21 moves between the one side Op and the other side Tp, a separator S is folded in a bellows shape. For instance, the movement direction Tr1 can also be said as a thickness direction of the separator S fed from the roller pair 131. Here, the bellows shape is a shape of a tape-like sheet folded with a width in a certain range and stacked, and is also referred to as a zigzag folded shape.

Figure 3:
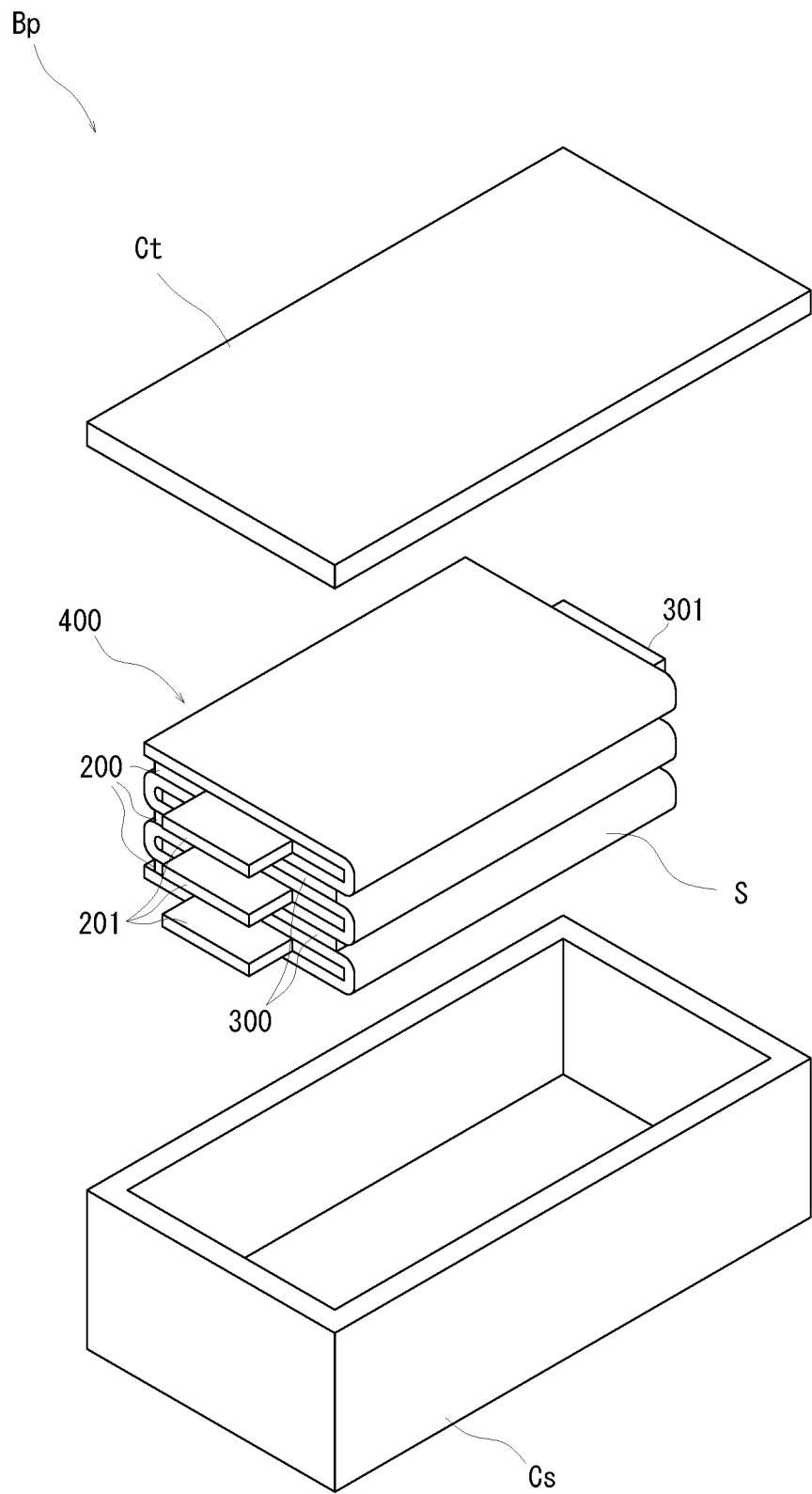
FIG. 3 is an exploded perspective view illustrating an outline of a stacked type battery.

The stacked cell manufacturing device 100 folds the tape-like separator S fed from a separator roll Sr in a bellows shape, and dispose negative electrode plates 200 and positive electrode plates 300 alternately in valley fold parts of the bellows-shaped folded separator S, so as to form a stacked cell 400 (see FIG. 3). The stacked cell 400 is used for a stacked type battery Bp (see FIG. 3). In the following description, electrodes before being stacked are referred to as electrode plates Ep.

Stacked Battery Bp

Here, an example of the stacked type battery Bp is described with reference to the drawings. FIG. 3 is an exploded perspective view illustrating an outline of the stacked type battery Bp. As illustrated in FIG. 3, the stacked type battery Bp includes a case Cs and the stacked cell 400. The case Cs has a substantially rectangular box shape, for example, with an open upper part, which is closed by a lid Ct. In the stacked type battery Bp, the stacked cell 400 is housed inside the case Cs with electrolytic solution. Further, the lid Ct closes and seals the opening so that the electrolytic solution does not leak.

The stacked cell 400 includes the negative electrode plates 200, the positive electrode plates 300, and the separator S. The separator S is made of material that has insulating properties and can transmit ions. Further, the separator S is folded in a bellows shape. The negative electrode plates 200 and the positive electrode plates 300 are disposed alternately in the valley fold parts of the separator S so that the stacked cell 400 is formed. Note that the stacked cell 400 illustrated in FIG. 3 has a structure in which the three negative electrode plates 200 and the two positive electrode plates 300 are stacked, but an actual number of the stacked layers is not limited to this.

The negative electrode plate 200 is a flat plate made of conductive material having a rectangular shape in a plan view. The negative electrode plate 200 has a terminal part 201 protruding from one of a pair of short sides. In addition, similarly to the negative electrode plate 200, the positive electrode plate 300 is a flat plate made of conductive material having a rectangular shape in a plan view. The positive electrode plate 300 has a terminal part 301 protruding from one of a pair of short sides. Note that in the stacked cell 400, the negative electrode plates 200 and the positive electrode plates 300 are stacked in such a manner that the terminal part 201 and the terminal part 301 protrude from opposite sides to each other, for example. Note that although not illustrated, the terminal parts 201 of the negative electrode plates 200 are electrically connected to each other, while the terminal parts 301 of the positive electrode plates 300 are electrically connected to each other. The connection of the terminal parts is not limited to this.

As illustrated in FIG. 3, the short side of the negative electrode plate 200 is longer than the short side of the positive electrode plate 300. Further, in a plan view, the negative electrode plate 200 is disposed so as to cover the positive electrode plate 300. Further, both ends in the stacking direction are the negative electrode plates 200. Note that the structure illustrated in FIG. 3 is an example. It may be possible to adopt a structure in which each end or one end in the stacking direction is the positive electrode plate 300. Further, the separator S is disposed on the outside of the both ends. Although the negative electrode plate 200 and the positive electrode plate 300 have a rectangular shape in a plan view in the stacked type battery Bp illustrated in FIG. 3, they may have a shape other than the rectangular shape, such as a square shape or a polygonal shape in a plan view. Note that output power of the stacked cell 400 is determined depending on the areas and the number of stacked layers of the negative electrode plate 200 and the positive electrode plate 300. In other words, the areas and the number of stacked layers of the negative electrode plate 200 and the positive electrode plate 300 are determined in accordance with capacity or the like required to the stacked type battery Bp.

The stacked cell manufacturing device 100 produces the stacked cells 400 described above. Next, details of the stacked cell manufacturing device 100 is described. As illustrated in FIGS. 1 and 2, the stacked cell manufacturing device 100 includes a separator feed unit 1, a folding unit 2, an electrode feed unit 3, a stacked cell separating unit 4, and a control unit 5 (see FIG. 2). The stacked cell manufacturing device 100 is controlled by the control unit 5.

Control Unit 5

The control unit 5 includes, for example, a processing circuit 51 and a storage circuit 52. The processing circuit 51 is a circuit that processes various information, and includes an arithmetic circuit such as a CPU, an MPU, or the like. In addition, the processing circuit 51 controls drive of individual units of the stacked cell manufacturing device 100 based on the processing result.

The storage circuit 52 is a circuit including or connected to storage media such as a ROM, a RAM or other semiconductor memory, a flash memory or other memory having portability, and a hard disk or the like. It may be possible that various programs such as a control program or a processing program are stored in the storage circuit 52, and that the program corresponding to the process is read out as necessary so that the processing circuit 51 can execute the program for performing the process.

Separator Feed Unit 1

As illustrated in FIG. 1, the separator feed unit 1 feeds to the folding unit 2 the tape-like separator S pulled out from the separator roll Sr. The separator feed unit 1 includes a separator roll attachment unit 11, a separator conveying unit 12, a separator roller 13, and a connecting unit 14.

Separator Roll Attachment Unit 11

The separator roll Sr is attached to the separator roll attachment unit 11 in a rotatable manner. The stacked cell manufacturing device 100 illustrated in FIG. 1 includes two separator roll attachment units 11, for example. The separator rolls Sr are attached to the two separator roll attachment units 11, respectively and independently. The separator roll Sr can rotate so that the separator S can be pulled out from the separator roll Sr.

Each of the separator roll attachment units 11 has a separator remaining amount detector 111 (see FIG. 2) that detects a remaining amount of the attached separator roll Sr. The separator roll Sr is formed by winding the separator S. Therefore, when the separator S is pulled out, the diameter of the separator roll Sr decreases. The separator remaining amount detector 111 detects the diameter of the separator roll Sr so as to detect the remaining amount of the separator roll Sr. Note that the method of detecting the remaining amount of the separator roll Sr is not limited to this example.

Separator Conveying Unit 12

The separator conveying unit 12 conveys the separator S to the separator roller 13. The separator conveying unit 12 includes a conveying roller 121, a conveyance path adjustment unit 122, a traction roller 123, and a tension measuring unit 124.

The conveying roller 121 is a roller disposed in a rotatable manner and its outer circumference surface contacts with the tape-like separator S. The conveying roller 121 guides conveyance of the separator S. In the stacked cell manufacturing device 100, the separator S contacts with the outer circumference surface of the conveying roller 121 and its conveyance direction is bent. The conveying roller 121 may contact with a linearly conveyed part of the separator S so as to guide the same. Note that the stacked cell manufacturing device 100 of this embodiment is described with an example having one conveying roller 121, but it may have a plurality of conveying rollers 121.

The conveyance path adjustment unit 122 includes a movable roller 125 that is rotatable and movable. The movable roller 125 is disposed in a manner capable of approaching or separating from the conveying roller 121. The rotation axis of the movable roller 125 is parallel to the rotation axis of the conveying roller 121. As the movable roller 125 separates more from the conveying roller 121, a pulled-out length of the separator S is longer, and when it moves in the opposite direction, the pulled-out length of the separator S decreases. In other words, depending on the position of the movable roller 125, a separator conveyance route in the separator conveying unit 12, i.e., a conveyance distance varies. According to an instruction from the control unit 5, the conveyance path adjustment unit 122 moves the movable roller 125 to approach or separate from the conveying roller 121.

As illustrated in FIG. 1, in the stacked cell manufacturing device 100, the separator S turns around the movable roller 125 and is sent to the traction roller 123. The traction roller 123 is a roller disposed in a rotatable manner. The traction roller 123 has a not-shown drive unit and is controlled to rotate based on an instruction from the control unit 5.

An outer circumference surface of the traction roller 123 sucks the separator S, for example. Therefore, friction force between the separator S and the traction roller 123 is larger than that between the separator S and the conveying roller 121 or the conveyance path adjustment unit 122. The traction roller 123 can change tensions of the separator S on the upstream side and the downstream side of the traction roller 123 in the conveyance direction, by its rotation speed.

In other words, the traction roller 123 can apply different tensions to the separator S on the upstream side and the downstream side.

In the stacked cell manufacturing device 100 of this embodiment, the traction roller 123 uses one roller. Without limiting to this structure, however, it may be possible, for example, to dispose two rollers having parallel rotation axes, so that outer circumference surfaces of them contact each other and that the contact past (nip part) hold the separator S.

The separator S turns around the traction roller 123 and is sent to the tension measuring unit 124. The tension measuring unit 124 measures tension of the separator S. The tension measured by the tension measuring unit 124 is sent to the control unit 5. The tension measuring unit 124 can be a load cell, for example, but this is not a limitation. It is possible to widely adopt a structure capable of measuring tension of the separator S accurately and quickly. The separator S is bent by the tension measuring unit 124 and is sent to the separator roller 13 disposed below. The separator conveying unit 12 has an edge detector 126 disposed between the tension measuring unit 124 and the separator roller 13. The edge detector 126 detects an edge of the separator S in the width direction. The edge detector 126 can detect meandering of the separator S, a variation of the width thereof, and the like, for example.

Separator Roller 13

The separator roller 13 feeds the separator S from the separator feed unit 1 to the folding unit 2. The separator roller 13 includes the roller pair 131. The roller pair 131 includes two rollers having parallel rotation axes.

When the table for stacking 21 of the folding unit 2 moves in the movement direction Tr1, the roller pair 131 of the separator roller 13 is moved upward not to interfere with the folding unit 2, on the basis of an instruction from the control unit 5. Details of the movement of the roller pair 131 in the up and down direction will be described later.

Connecting Unit 14

In the stacked cell manufacturing device 100, the separator S is pulled out alternately from the two separator rolls Sr attached to the two separator roll attachment units 11. The leading ends in the conveyance direction of the separators S pulled out respectively from the separator rolls Sr are held by the connecting unit 14. Further, the connecting unit 14 sends the separator S from one of the separator rolls Sr to the separator conveying unit 12.

The connecting unit 14 is connected to the control unit 5 and operates according to instructions from the control unit 5. When the remaining amount of one separator roll Sr becomes less than a certain amount, the connecting unit 14 connects the separator S pulled out from the other separator roll Sr to the rear end in the conveyance direction of the separator S from the one separator roll Sr. Note that after switching from the one separator roll Sr to the other separator roll Sr to pull out the separator S, a new separator roll Sr is attached to the one separator roll attachment unit 11. In this way, the connecting unit 14 performs the automatic connection based on the remaining amounts of the two separator rolls Sr, and hence stop time for replacing the separator roll Sr can be reduced.

As to the structure of the connecting unit 14, it is possible to adopt the same structure of a conventional and well-known device for connecting tape-like members. Therefore, description of detailed structure of the connecting unit 14 is omitted. In addition, operations of the stacked cell manufacturing device 100 when the connecting unit 14 connects the separators S will be described later.

The separator feed unit 1 has the structure described above. The separator S is fed from the separator feed unit 1 to the folding unit 2. Next, details of the folding unit 2 is described.

Folding Unit 2

Figure 4:
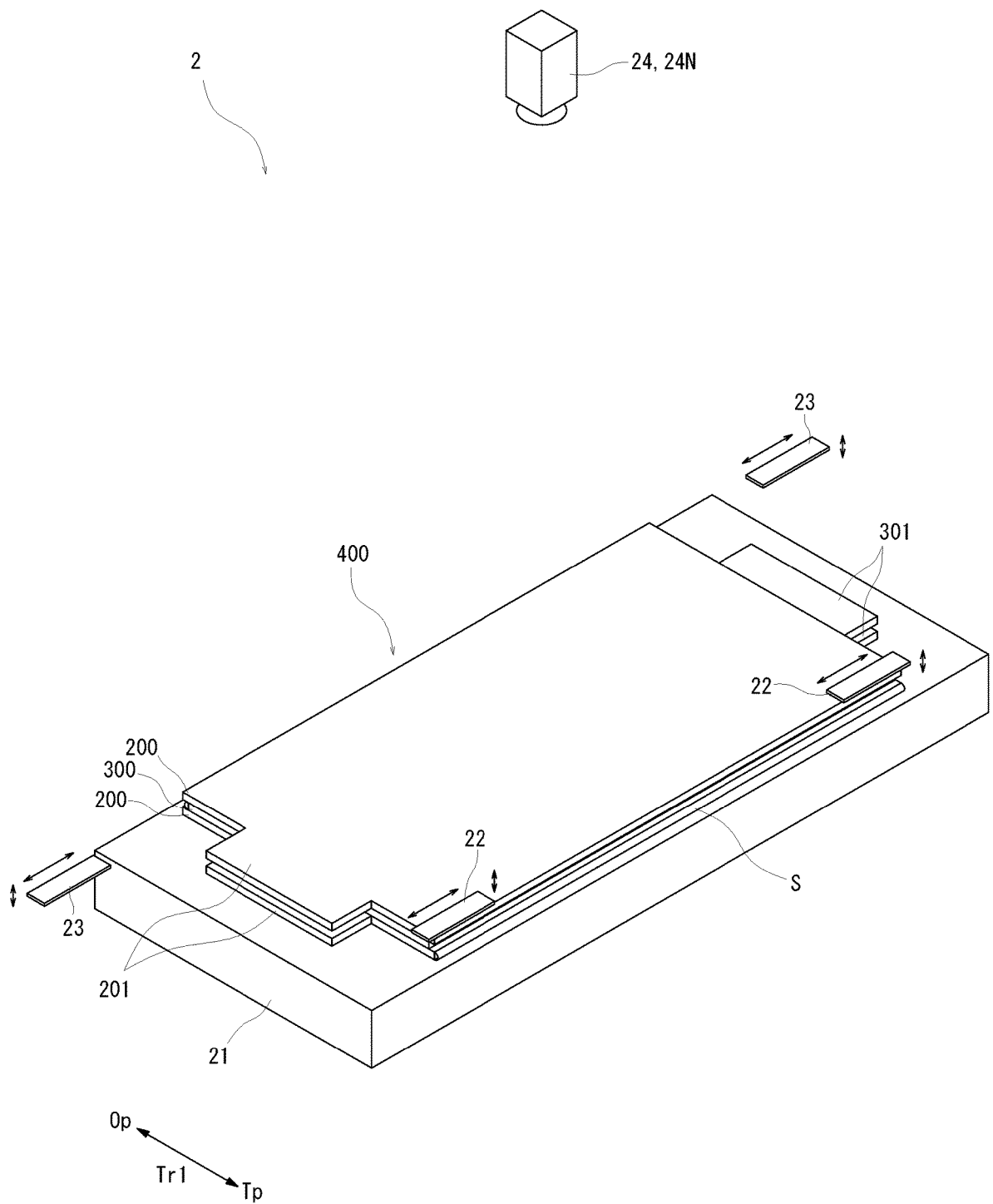
FIG. 4 is an enlarged perspective view of a folding unit.

FIG. 4 is an enlarged perspective view of the folding unit 2. FIG. 4 illustrates the table for stacking 21 with a stacked body 500 before the stacking is completed, and illustration of the separator S is omitted.

As illustrated in FIG. 1, the folding unit 2 folds the separator S fed from the separator roller 13, in a bellows shape. In the stacked cell manufacturing device 100, the folding unit 2 is disposed horizontally to or below the roller pair 131 of the separator roller 13. The folding unit 2 includes the table for stacking 21, a first claw part 22, and a second claw part 23. Furthermore, it may include an imaging unit for checking 24.

Table for Stacking 21

The table for stacking 21 has a rectangular shape in a plan view. The table for stacking 21 is moved in a reciprocating manner by a table moving unit for stacking 211 (see FIG. 2) controlled by the control unit 5. In a front view, the table for stacking 21 moves in a reciprocating manner, between a first position P1 on one side Op (see FIG. 8 or the like described later) and a second position P2 on the other side Tp (see FIG. 16 or the like described later) with respect to the roller pair 131 of the separator roller 13.

In addition, the first claw part 22 and the second claw part 23 described later holds the separator S on the upper surface of the table for stacking 21. Furthermore, it may be possible to provide a plurality of holes (not shown) to the upper surface of the table for stacking 21, and to suck air through the holes so that the separator S is absorbed (vacuum-absorbed). Note that similarly to the structure with holes, it may be made of material having gaps such as mesh or porous material. With the structure described above, the table for stacking 21 holds the separator S.

When the table for stacking 21 moves to the first position P1, the electrode plate Ep fed from the electrode feed unit 3 is placed on the upper part of the bellows-shaped folded separator S. The electrode plate Ep is used as the negative electrode plate 200 or the positive electrode plate 300 in the stacked cell 400. When the table for stacking 21 is at the first position P1 (see FIG. 8), the electrode plate Ep as the negative electrode plate 200 is placed on the upper part of the table for stacking 21, while when the table for stacking 21 is at the second position P2 (see FIG. 16), the electrode plate Ep as the positive electrode plate 300 is placed on the same.

The electrode plate Ep is made to contain metal such as aluminum having conductivity. In addition, the electrode plate Ep has a rectangular shape in a plan view, and has a protrusion Epm that protrudes outward in the longitudinal direction from one short side (see FIG. 8 or the like). The protrusion Epm is a part to be the terminal part 201 of the negative electrode plate 200, or the terminal part 301 of the positive electrode plate 300. Every time when the table for stacking 21 repeats the reciprocating movement, the negative electrode plate 200 and the positive electrode plate 300 are stacked.

The table for stacking 21 can also move in the up and down direction. The table for stacking moves downward by the thickness of the electrode plate Ep every time when the negative electrode plate 200 or the positive electrode plate 300 is stacked. In this way, the upper surface of the stacked body 500 that is being stacked on the upper part of the table for stacking 21 can be always at a constant height. In this way, the electrode plate Ep can be accurately conveyed by a second conveying unit 332 described later.

First Claw Part 22 and Second Claw Part 23

As illustrated in FIG. 4, the first claw part 22 and the second claw part 23 are disposed above the table for stacking 21. The first claw part 22 presses a corner on the other side Tp of the upper surface of the negative electrode plate 200 placed on the upper part of the bellows-shaped folded separator S, on the upper part of the table for stacking 21 at the first position P1. The first claw part 22 is controlled to move by the control unit 5, and is moved in the horizontal direction perpendicular to the up and down direction and the movement direction. Note that in the stacked cell manufacturing device 100, a pair of the first claw parts 22 are disposed in the longitudinal direction of the table for stacking 21, but this is not a limitation.

The second claw part 23 presses a corner on the one side Op of the upper surface of the positive electrode plate 300 placed on the upper part of the bellows-shaped folded separator S, on the upper part of the table for stacking 21 at the second position P2. The second claw part 23 is controlled to move by the control unit 5, and is moved in the horizontal direction perpendicular to the up and down direction and the movement direction. Note that in the stacked cell manufacturing device 100, a pair of the second claw parts 23 are disposed in the longitudinal direction of the table for stacking 21, but this is not a limitation.

After the second claw part 23 presses the positive electrode plate 300, the first claw part 22 moves from the stacked body 500 in the horizontal direction to a retreat position, which does not overlap the electrode plate Ep placed on the table for stacking 21 in a plan view. Note that the retreat position of the first claw part 22 can be selected from a wide area that does not interfere with the electrode plate Ep when it is placed to be the negative electrode plate 200, but after that, it is required to press the negative electrode plate 200. Therefore, the retreat position of the first claw part 22 is preferably near the table for stacking 21, for example.

In addition, after the first claw part 22 presses the negative electrode plate 200, the second claw part 23 moves from the stacked body 500 in the horizontal direction to a retreat position, which does not overlap the electrode plate Ep disposed on the table for stacking 21 in a plan view. Note that the retreat position of the second claw part 23 can be selected from a wide area that does not interfere with the electrode plate Ep when it is placed to be the positive electrode plate 300, but after that, it is required to press the positive electrode plate 300. Therefore, the retreat position of the second claw part 23 is preferably near the table for stacking 21, for example.

Imaging Unit for Checking 24

The imaging unit for checking 24 takes an image of the negative electrode plate 200 or the positive electrode plate 300 placed on the table for stacking 21. The imaging unit for checking 24 is disposed above each of the table for stacking 21 placed at the first position P1 and the table for stacking 21 placed at the second position P2. Note that the imaging unit above the first position P1 is referred to as an imaging unit for checking 24N, while the imaging unit above the second position P2 is referred to as an imaging unit for checking 24P, as necessary for discrimination (see FIG. 1 or the like).

In the stacked cell manufacturing device 100 according to this embodiment, the separator roller 13 is fixed in the horizontal direction, and the table for stacking 21 moves, so that the separator S is folded in a bellows shape, and that the negative electrode plate 200 and the positive electrode plate 300 are stacked. Therefore, compared with the conventional structure of moving the separator roller 13, the separator roller 13 hardly interfere with imaging, and this is preferable.

In addition, the imaging unit for checking 24N is fixed above the first position P1, while the imaging unit for checking 24P is fixed above the second position P2. Therefore, the imaging unit for checking 24N and the imaging unit for checking 24P have fixed angles of view, and the captured image data for checking Img (FIG. 14 described later) can be taken with a constant shape and size using the imaging unit for checking 24N and the imaging unit for checking 24P. In this way, accuracy of checking based on the captured image data for checking Img can be enhanced.

Electrode Feed Unit 3

Figure 5:
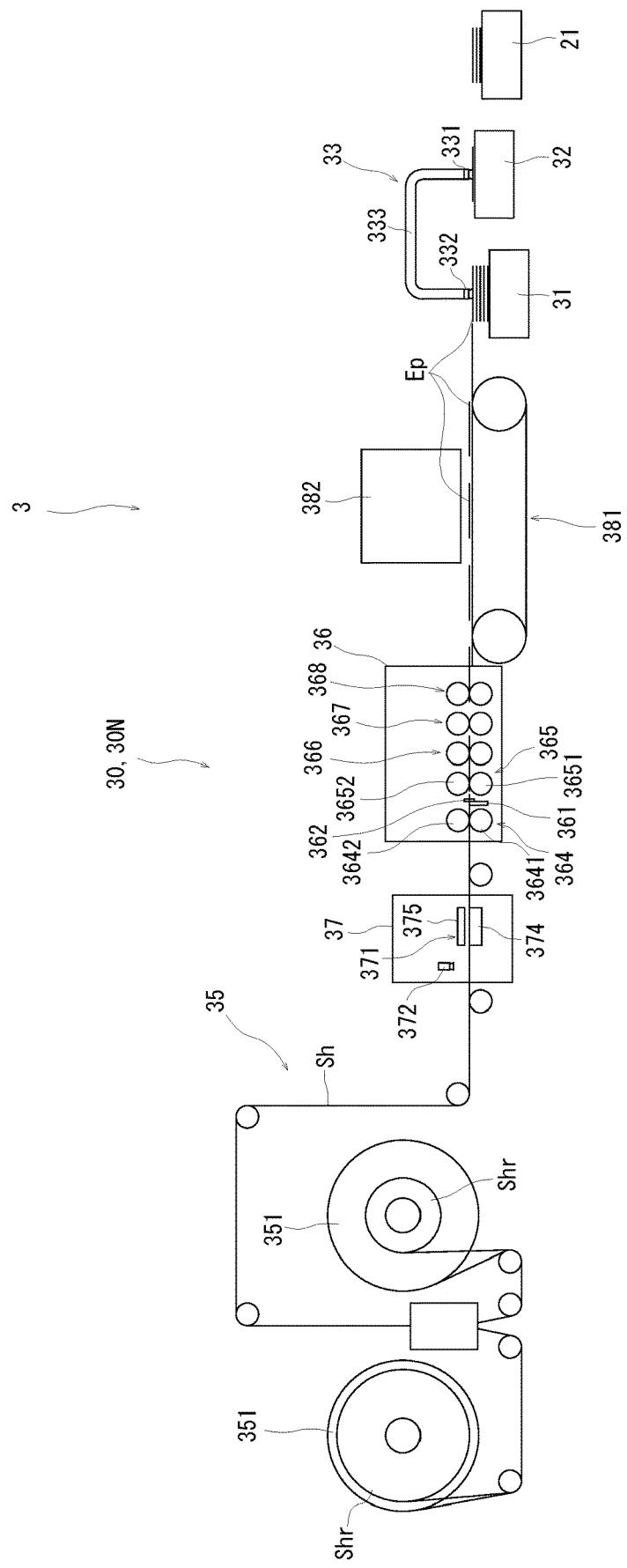
FIG. 5 is a schematic layout diagram of an electrode feed unit.
Figure 6:
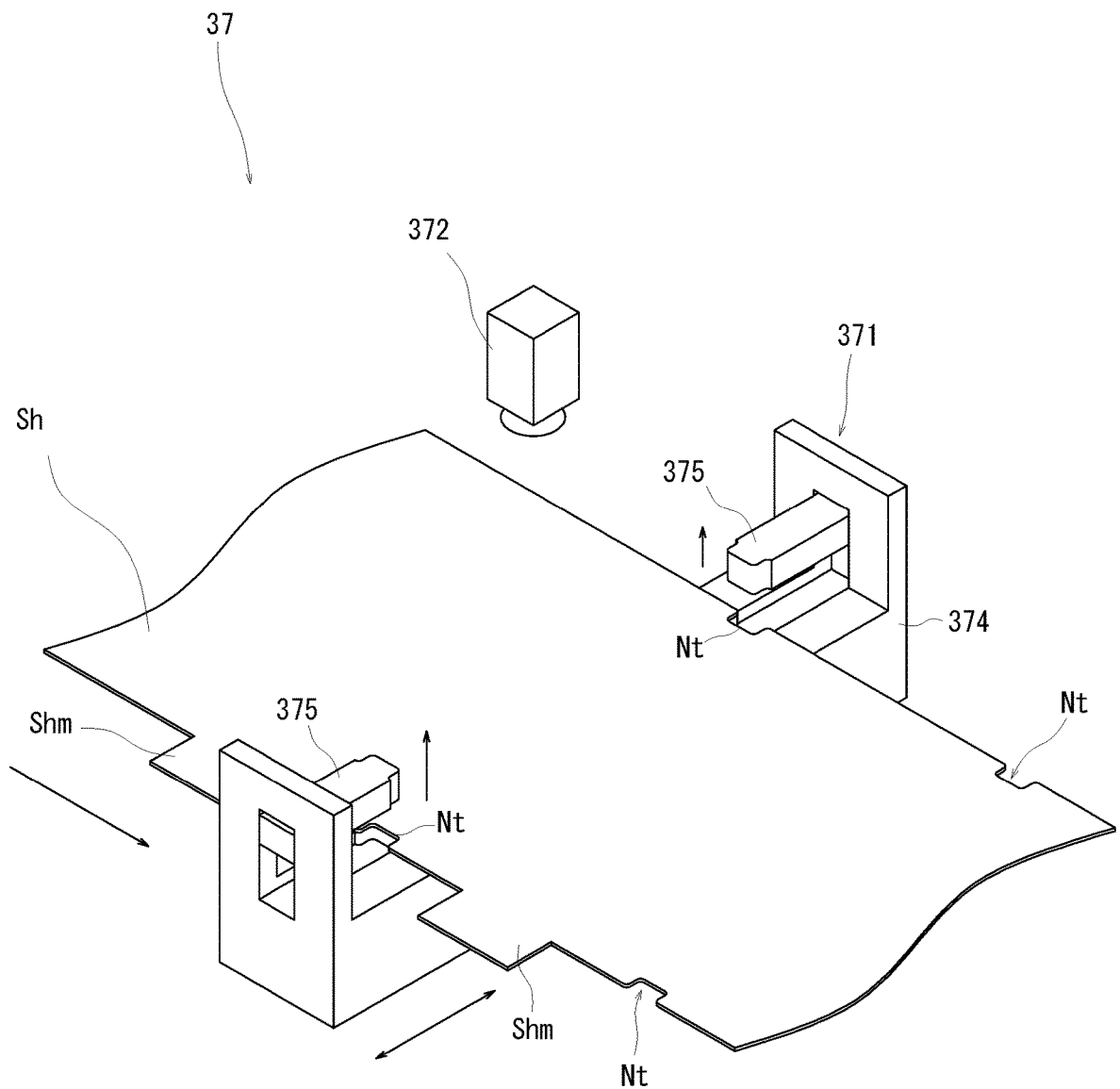
FIG. 6 is a perspective view of a notch forming unit.
Figure 7:
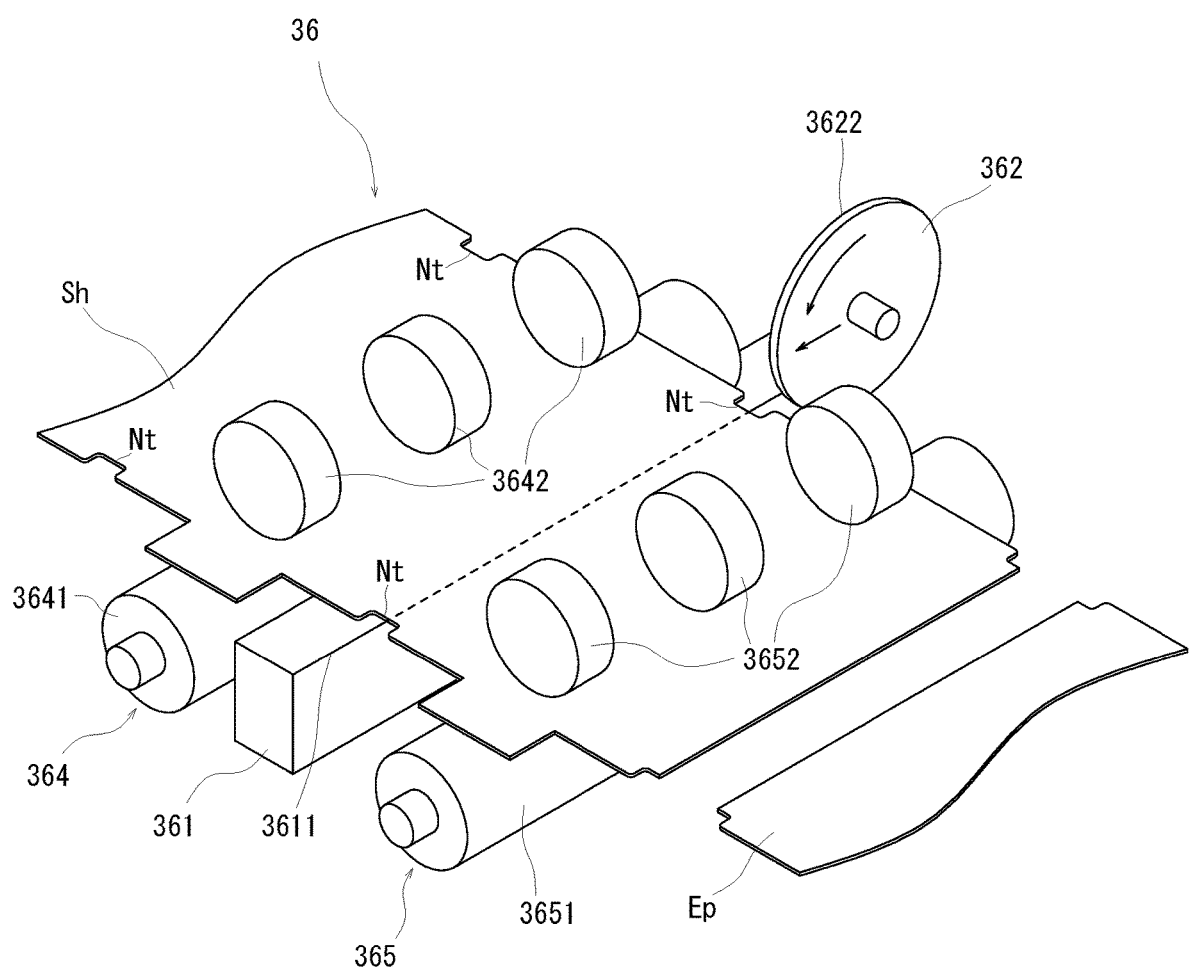
FIG. 7 is a perspective view of an electrode cutting unit.

Next, details of the electrode feed unit 3 is described with reference to the drawings. FIG. 5 is a schematic layout diagram of the electrode feed unit 3. FIG. 6 is a perspective view of a notch forming unit 37. FIG. 7 is a perspective view of an electrode cutting unit 36. As illustrated in FIG. 1, in the stacked cell manufacturing device 100, the electrode feed unit 3 includes two electrode plate feed units 30, for example. The two electrode plate feed units 30 are disposed on the one side Op and the other side Tp, respectively, in the movement direction Tr1. The electrode plate feed unit 30 disposed on the one side Op feeds the electrode plate Ep that is stacked to be the negative electrode plate 200. The electrode plate feed unit 30 disposed on the other side Tp feeds the electrode plate Ep that is stacked to be the positive electrode plate 300. Note that the electrode plate feed unit 30 that feeds the electrode plate Ep to be the negative electrode plate 200 is referred to as an electrode plate feed unit 30N, while the electrode plate feed unit 30 that feeds the electrode plate Ep to be the positive electrode plate 300 is referred to as an electrode plate feed unit 30P, as necessary for discrimination.

The electrode plate feed unit 30N and the electrode plate feed unit 30P have different conductive sheets Sh before the electrode plate Ep is formed. Specifically, the material to form the conductive sheet Sh is different, and the direction and shape of a protrusion Shm are different between them. Other than these points, the electrode plate feed unit 30N and the electrode plate feed unit 30P have substantially the same structure. Therefore, the electrode plate feed unit 30N is illustrated in FIG. 5, and the electrode plate feed unit 30N is described as reference. In addition, FIGS. 6 and 7 also illustrate the notch forming unit 37 and the electrode cutting unit 36 disposed in the electrode plate feed unit 30N.

FIGS. 5, 6, and 7 illustrate the electrode plate feed unit 30N or a part thereof. The conductive sheet Sh conveyed in the electrode plate feed unit 30N has protrusions Shm to be the terminal parts 201 on one side in the width direction, for example. The protrusions Shm may be provided to the conductive sheet Sh in advance, or may be formed in the electrode feed unit 3. Here, it is supposed that they are provided to the conductive sheet Sh in advance.

As illustrated in FIG. 5 as an example, the electrode plate feed unit 30N includes a standby table 31, a position adjusting table 32, a conveying unit 33, an imaging unit for adjustment 34, a conductive sheet conveying unit 35, the electrode cutting unit 36, the notch forming unit 37, a conveyor 381, and a cleaner 382. In the electrode plate feed unit 30N, the conductive sheet Sh pulled out from a conductive sheet roll Shr, which is formed by winding the conductive sheet Sh in a roll shape, is cut in a predetermined length so that the electrode plate Ep is made. Then, the electrode plate Ep is fed to the table for stacking 21.

Note that a structure may be adopted in which the standby table 31 is not provided, and the end part of the conveyor 381 on the side of the position adjusting table 32 is also used as the standby table. In addition, a structure may be adopted in which the position adjusting table 32, the notch forming unit 37, the cleaner 382, or the like is not provided.

In addition, in the structure without the position adjusting table 32, it may be possible to adjust the position of the electrode plate Ep on the way of transferring from the standby table 31 (including the structure in which the end part of the conveyor 381 is used as the same) to the table for stacking 21, and to place the electrode plate Ep after the adjustment on the table for stacking 21.

Conductive Sheet Conveying Unit 35

The conductive sheet conveying unit 35 includes a conductive sheet roll attachment unit 351. Note that FIG. 5 illustrates an example of two rolls, but a single roll may be possible. The electrode plate feed unit 30N includes two conductive sheet roll attachment units 351, to which the conductive sheet rolls Shr are attached respectively. In the conductive sheet conveying unit 35, the conductive sheet Sh is pulled out from one of the conductive sheet rolls Shr, which is attached to one of the conductive sheet roll attachment units 351, and is conveyed. Further, when a remaining amount of one conductive sheet roll Shr becomes a certain amount or less, the conductive sheet Sh is automatically pulled out from the other conductive sheet roll Shr attached to the other conductive sheet roll attachment unit 351. In this way, it is not necessary to stop the electrode plate feed unit 30N for attaching the conductive sheet roll Shr, and the time necessary for manufacturing the stacked cell 400 can be reduced.

The conductive sheet conveying unit 35 includes a plurality of rollers for conveying the conductive sheet Sh pulled out from the conductive sheet roll Shr. The conductive sheet Sh conveyed by the conductive sheet conveying unit 35 is cut by the electrode cutting unit 36, and the electrode plate Ep is formed. The electrode cutting unit 36 cuts the conductive sheet Sh with reference to notches Nt formed on both sides of the conductive sheet Sh in the width direction. Therefore, in the conductive sheet conveying unit 35, the notch forming unit 37 is disposed on the upstream side of the electrode cutting unit 36.

Notch Forming Unit 37

The notch forming unit 37 forms the notches Nt on both sides in the width direction of the conveyed conductive sheet Sh. The notch forming unit 37 can have a structure for cutting foil by a normal cutting method, for example, a structure illustrated in FIG. 5 as an example, which includes a notching mold 371, an edge detector 372, and a mold moving unit 373 (see FIG. 2). In addition, other structure may be adopted, and it is possible to widely adopt a structure using a laser cutting method or the like, for example.

As illustrated in FIG. 6, the notching mold 371 includes a die 374 and a punch 375. The die 374 has a recess with which the punch 375 engages. In the state where the side of the conductive sheet Sh as a work is placed on the die 374, the punch 375 is pressed into the recess, and the notch is formed. The die 374 has two recesses arranged in the width direction of the conductive sheet Sh. Further, a pair of the punches 375 are arranged in the width direction to be capable of engaging with the recesses, respectively.

The notching mold 371 can move in the width direction of the conveyed conductive sheet Sh. In other words, the notching mold 371 can be positioned with respect to the side of the conductive sheet Sh. The notching mold 371 includes the common die 374 and the two punches 375, which move as a unit in the width direction of the conductive sheet Sh. Without limiting to this structure, however, it may be possible that there are separate dies 374 in the width direction, which move independently.

The edge detector 372 is disposed on the upstream side of the notching mold 371 in the conveyance direction of the conductive sheet Sh. The edge detector 372 detects the side end (edge) of the conductive sheet Sh. Then, it sends edge information to the control unit 5. Note that the edge detector 372 can have a structure for taking an image, but without limiting to this, it is possible to widely adopt a method of accurately detecting the edge of the conductive sheet Sh.

The mold moving unit 373 is connected to the control unit 5 and can move the notching mold 371 in the width direction of the conductive sheet Sh. On the basis of the edge information on the upstream side in the conveyance direction of the conductive sheet Sh sent from the edge detector 372, the control unit 5 moves the notching mold 371 so that the notch Nt is formed at a preset position of the conductive sheet Sh.

As the notch forming unit 37 is configured as described above, even if the conductive sheet Sh conveyed by the conductive sheet conveying unit 35 is meandering, appropriate notches can be formed at the edges of the conductive sheet Sh.

The edge detector 372 has the structure to detect the edge on one side in the width direction of the conductive sheet Sh, but without limiting to this, it may be possible to detect both edges. If the edge detector 372 has a structure to detect both edges of the conductive sheet Sh, it is preferred to move the notching molds 371 independently on both edges in the width direction. In this way, even if the width of the conductive sheet Sh varies, appropriate notches can be formed at the edges of the conductive sheet Sh.

After the notches are formed at the edges by the notch forming unit 37, the conductive sheet Sh is sent to the electrode cutting unit 36.

Electrode Cutting Unit 36

As illustrated in FIG. 7, the electrode cutting unit 36 includes a fixed blade 361, a rotary blade 362, a rotary blade moving unit 363 (see FIG. 2), a first conveying roller unit 364, and a second conveying roller unit 365.

The conductive sheet Sh to be conveyed to the electrode cutting unit 36 is conveyed by the first conveying roller unit 364 and the second conveying roller unit 365. As illustrated in FIG. 7 as an example, the first conveying roller unit 364 includes a lower roller 3641 disposed under the conductive sheet Sh to have an axial length more than the width of the conductive sheet Sh, and upper rollers 3642 disposed above the lower roller 3641 so that three of them are arranged in the width direction of the conductive sheet Sh.

The first conveying roller unit 364 holds the conductive sheet Sh between the lower roller 3641 and the upper rollers 3642. Further, the first conveying roller unit 364 is connected to the control unit 5 and is rotated by a not-shown drive unit. Note that the first conveying roller unit 364 has three upper rollers 3642, but this is not a limitation. It is possible to widely adopt a structure capable of securely holding the conductive sheet Sh.

The second conveying roller unit 365 includes a lower roller 3651 disposed under the conductive sheet Sh to have an axial length more than the width of the conductive sheet Sh, an upper rollers 3652 disposed above the lower roller 3651 so that three of them are arranged in the width direction of the conductive sheet Sh.

The second conveying roller unit 365 holds the conductive sheet Sh between the lower roller 3651 and the upper rollers 3652. Further, the second conveying roller unit 365 is connected to the control unit 5 and is rotated by a not-shown drive unit.

In addition, three conveying roller units 366, 367, and 368 are disposed on the downstream side of the second conveying roller unit 365 (see FIG. 5). Each of the conveying roller units 366, 367, and 368 has the same structure as the second conveying roller unit 365.

In the stacked cell manufacturing device 100 of this embodiment, the electrode plate feed unit 30 (30N, 30P) cuts the conductive sheet Sh to make the electrode plates Ep and feed them to the stacked body 500. An operator handles the conductive sheet roll Shr that is easier to convey or attach than the electrode plates Ep, and hence workability is high.

Fixed Blade 361, Rotary Blade 362, and Rotary Blade Moving Unit 363

The fixed blade 361 and the rotary blade 362 are disposed between the first conveying roller unit 364 and the second conveying roller unit 365. The fixed blade 361 is disposed between the lower roller 3641 and the lower roller 3651. The fixed blade 361 is made of high hardness material such as tool steel or cemented carbide alloy. In the electrode cutting unit 36, the fixed blade 361 has a rectangular solid shape, and one of edge lines thereof forms a fixed cutting blade 3611. The conductive sheet Sh is conveyed over the fixed cutting blade 3611.

The rotary blade 362 is made of high hardness material similarly to the fixed blade 361. The material of the rotary blade 362 may be the same as or different from that of the fixed blade 361. The rotary blade 362 has a disk shape, and the outer edge thereof forms a rotary cutting blade 3621.

The rotary blade moving unit 363 can rotate and move the rotary blade 362 along the fixed blade 361. In the state where the rotary cutting blade 3621 contacts with the fixed cutting blade 3611, the rotary blade moving unit 363 moves the rotary blade 362 along the fixed blade 361 while rotating the same, so that the conveyed conductive sheet Sh can be cut. Note that it may be possible to provide a biasing member such as a spring to bias the rotary blade 362 toward the fixed blade 361 so that the fixed cutting blade 3611 and the rotary cutting blade 3621 contact each other securely.

The rotary blade moving unit 363 operates according to instructions from the control unit 5. In the electrode cutting unit 36, a not-shown detector detects the notch formed at the edge of the conductive sheet Sh. Further, when the detector detects the notch, the control unit 5 sends an instruction to the rotary blade moving unit 363 to drive and move the rotary blade 362, so as to cut the conductive sheet Sh in such a manner that the notches are connected to each other. When the conductive sheet Sh is cut in the electrode cutting unit 36, the electrode plate Ep is formed.

As the rotary blade 362 has a disk shape, a simple structure can be realized, and accuracy of the shape of the rotary cutting blade 3621 can be enhanced easily. In addition, with the structure in which the rotary cutting blade 3621 of the rotary blade 362 rotates while contacting with the fixed cutting blade 3611 of the fixed blade 361, even if accuracy of combination of the fixed cutting blade 3611 and the rotary cutting blade 3621 is varied a little, accuracy of cutting can be enhanced.

In addition, if wearing of the "blades" can be a problem, a structure may be adopted in which a tiny gap is formed between the rotary cutting blade 3621 of the rotary blade 362 and the fixed cutting blade 3611 of the fixed blade 361, as a non-contact state (hereinafter also referred to as a proximity or proximate state), for performing the cutting. Note that by changing the rotation speed of the rotary blade 362 with respect to the feed amount of the rotary blade 362 toward the fixed blade 361, sharpness of cutting can be changed. Therefore, this is suitable in the case where wearing of the "blades" can be a problem.

For instance, the conductive sheet Sh includes a part of metal foil (here, aluminum foil) only, a part of aluminum foil with an insulation layer (e.g. ceramics such as aluminum oxide) coated, a part of aluminum foil with active material coated. When the conductive sheet Sh is cut, exfoliation between the aluminum foil and the active material tends to occur at the cutting end. Therefore, in the electrode cutting unit 36, the rotational frequency of the rotary blade 362 is adjusted depending on a cutting position of the conductive sheet Sh. For instance, when cutting the end part, the rotational frequency is decreased. In this way, occurrence of exfoliation between the aluminum foil and the active material can be suppressed.

In addition, in the electrode cutting unit 36, the fixed blade 361 is a linear blade, and the rotary blade 362 rotates and moves from one end to the other end of the fixed blade 361 (forward), so as to cut the conductive sheet Sh, and after that the rotary blade 362 may rotate and move to return from the other end to the one end of the fixed blade 361 (backward), at this time, the conductive sheet Sh may be cut.

If the rotary blade 362 rotates and moves forward and backward, the same part of the rotary cutting blade 3621 of the rotary blade 362 always contacts or comes close to the fixed cutting blade 3611 of the fixed blade 361. Further, the conductive sheet Sh is sent to the same or substantially the same position of the fixed blade 361. Therefore, the conductive sheet Sh is cut by the same part of the rotary cutting blade 3621.

In the electrode cutting unit 36 having this structure, the control unit 5 may control the rotary blade moving unit 363 to idle the rotary blade 362 when the rotary blade 362 is at least one of the one end and the other end of the fixed blade 361, for example. With this control, it is possible to control different parts of the rotary cutting blade 3621 of the rotary blade 362 to contact or come close to the fixed cutting blade 3611 of the fixed blade 361, every time when cutting the conductive sheet Sh.

By performing the control described above, it is possible to cut the conductive sheet Sh by different parts of the rotary cutting blade 3621 of the rotary blade 362 every time. As a result, when cutting the conductive sheet Sh, it is possible to use different parts that contacts or comes close to the insulation layer for cutting, and it is possible to prevent that a part of the rotary cutting blade 3621 is worn intensively. In addition, it is possible to use different parts that contacts or comes close to the aluminum foil for cutting, and it is possible to prevent aluminum adhesion. In this way, deterioration of the rotary blade 362 can be prevented, and hence long life of the rotary blade 362 can be achieved.

Note that the rotation angle of the rotary blade 362 when it is idled is an angle other than multiples of 360 degrees. In this way, the part of the rotary cutting blade 3621 of the rotary blade 362 that contacts or comes close to the fixed cutting blade 3611 of the fixed blade 361 is varied, and the effect of preventing the intensive wearing or the adhesion can be enhanced, so that longer life of the rotary blade 362 can be achieved. In addition, the idling of the rotary blade 362 may be performed every time when cutting the conductive sheet Sh, or every time when the cutting is performed a plurality of times. Furthermore, the rotation angle of the rotary blade 362 when it is idled may be changed every time when the cutting is performed a predetermined times.

The electrode cutting unit 36 cuts the conductive sheet Sh in the state where the conductive sheet Sh is stopped. Here, if tension of the conductive sheet Sh is high, the conductive sheet Sh may be ripped at the point where rotary blade 362 contacts as soon as it contacts. In addition, even if the tension is not so high to cause ripping, if the tension is a certain level or higher, the tension when the cutting is performed tends to cause an unstable shape of the electrode plate Ep.

Therefore, when the electrode cutting unit 36 stops conveyance of the conductive sheet Sh, the control unit 5 stops the second conveying roller unit 365 after stopping the first conveying roller unit 364. In this way, appropriate tension can be applied to the part of the conductive sheet Sh between the first conveying roller unit 364 and the second conveying roller unit 365, and hence the shape can be stabled. Further, it is possible to prevent "bend" of the conductive sheet Sh that can be generated when the conductive sheet Sh is pushed and conveyed by the first conveying roller unit 364.

In addition, it may be possible that the control unit 5 stops the first conveying roller unit 364 and the second conveying roller unit 365 at the same time, and then rotate the second conveying roller unit 365 in the opposite direction to the conveyance direction. In this way, tension of the part of the conductive sheet Sh between the first conveying roller unit 364 and the second conveying roller unit 365 can be appropriately relaxed.

In other words, as the first conveying roller unit 364 and the second conveying roller unit 365 are controlled by the control unit 5 in this way, tension of the part of the conductive sheet Sh between the first conveying roller unit 364 and the second conveying roller unit 365 can be appropriately adjusted. As described above, it is possible to reduce occurrence of a malfunction such as unstable shape of the electrode plate Ep after cutting or ripping of the conductive sheet Sh.

When the conductive sheet Sh is cut by the fixed blade 361 and the rotary blade 362 in the electrode cutting unit 36, the electrode plate Ep is formed. In the electrode cutting unit 36, it is conveyed by the e.g. three conveying roller units 366, 367, and 368 on the downstream side of the second conveying roller unit 365. Further, the conveyor 381 is disposed on the downstream side of the electrode cutting unit 36 in the conveyance direction of the conductive sheet Sh. The electrode plate Ep is fed to the upper part of the standby table 31 by the conveyor 381.

The conveyor 381 moves at a certain speed (including a certain intermittent conveyance, and certain speed conveyances with a certain intermittent conveyance therebetween). Further, the control unit 5 controls rotations of the second conveying roller unit 365, and the conveying roller units 366, 367, and 368, so as to send the electrode plate Ep to the conveyor 381 at the same speed as the moving speed of the conveyor 381.

The conveyor 381 faces the cleaner 382. The electrode plate Ep conveyed by the conveyor 381 is cleaned by the cleaner 382. Note that the cleaner 382 can have a structure for blowing air or gas to blow off foreign objects, dirt, or the like, for example, but this is not a limitation. It is possible to widely adopt a structure that can clean the electrode plate Ep. The electrode plate Ep cleaned by the cleaner 382 is placed on the standby table 31. Note that a structure without the cleaner 382 may also be adopted.

Standby Table 31

Figure 8:
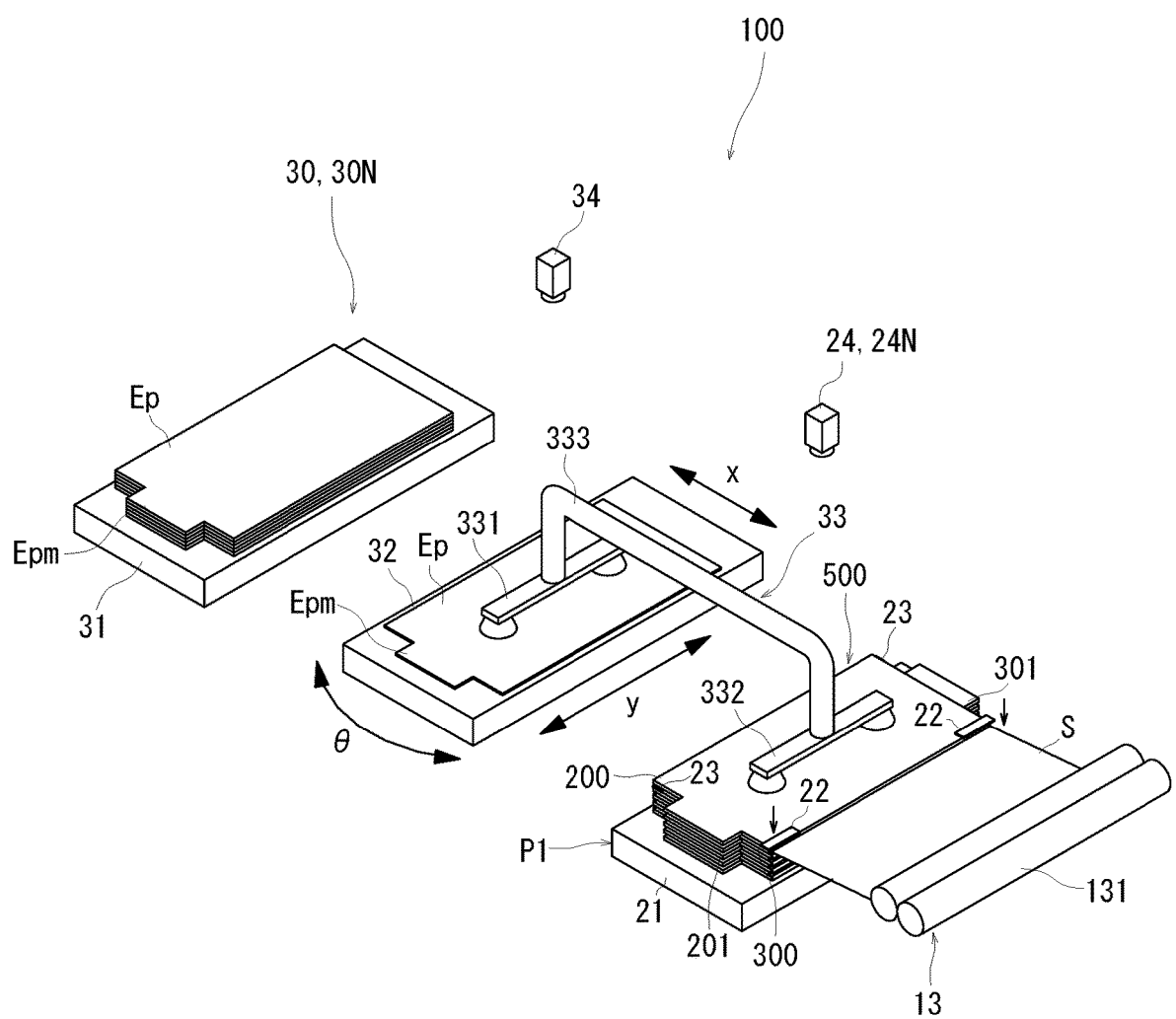
FIG. 8 is a perspective view illustrating a layout of a standby table and a position adjusting table.

FIG. 8 is a perspective view illustrating a layout of the standby table 31 and the position adjusting table 32. As illustrated in FIG. 8, the electrode plates Ep can be placed on the upper surface of the standby table 31. The electrode plate Ep placed on the standby table 31 is held by a first conveying unit 331 of the conveying unit 33 and is sent to the position adjusting table 32. The standby table 31 may be movable in the up and down direction so that the upper surface of the stacked electrode plates Ep is always at a constant position, in accordance with the number of the electrode plate Ep stacked on the upper surface. For instance, it moves downward by a distance corresponding to the thickness of the electrode plate Ep when the electrode plate Ep is fed from the conveyor 381, while it moves upward by a distance corresponding to the thickness of the electrode plate Ep when the electrode plate Ep is conveyed by the first conveying unit 331. Note that the movement of the standby table 31 in the up and down direction described above is an example, and this is not a limitation.

In addition, a structure may be adopted in which the end part of the conveyor 381 on the side of the position adjusting table 32 is also used as a substitute of the standby table, without providing the standby table 31. In this case, the electrode plate Ep on the end part of the conveyor 381 on the side of the position adjusting table 32 is held by the second conveying unit 332 of the conveying unit 33 and sent to the position adjusting table 32.

Position Adjusting Table 32 and Imaging Unit for Adjustment 34

The electrode plate Ep is sent from the conveyor 381 to the standby table 31. Therefore, a position of electrode plate Ep placed on the standby table 31 often varies with respect to the standby table 31. Therefore, in the electrode plate feed unit 30N, the electrode plate Ep is temporarily placed on the position adjusting table 32, and after position adjustment is performed on the position adjusting table 32, it is sent to the table for stacking 21. However, the position adjustment is not limited to being performed on the position adjusting table 32 but may be performed by other means or method.

As a structure without the position adjusting table 32, for example, the following structure can be considered. Specifically, it includes the standby table 31 (including the structure in which the end part of the conveyor 381 is used as the same, the same is true in the following description), the imaging unit for adjustment 34 that takes an image of the electrode plate Ep placed on the standby table 31. Further, when transferring the electrode plate Ep from the standby table 31 to the table for stacking 21, the control unit 5 adjusts the position of the electrode plate Ep so that the electrode plate Ep is fed to the normal position with respect to the separator S, on the basis of the captured image data of the electrode plate Ep placed on the standby table 31 from the imaging unit for adjustment 34, and after the adjustment, the electrode plate Ep is placed on the table for stacking 21.

In addition, the structure described above may further includes the imaging unit for checking 24 to take an image of the electrode plate Ep placed on the table for stacking 21, and based on the captured image data of the electrode plate Ep placed on the table for stacking 21 from the imaging unit for checking 24, the control unit 5 may further perform adjustment (fine adjustment) of the position of the electrode plate Ep. With the structure described above, adjustment process of the position of the electrode plate Ep can be performed at a higher speed.

The position adjusting table 32 itself can move in the x direction along the conveyance direction of the separator S, in they direction that is the width direction of the separator S, and in the θ direction that is the circumferential direction of a circle around the normal of the separator S. Further, when the position adjusting table 32 moves, the position of the electrode plate Ep placed on the position adjusting table 32 is adjusted. If the electrode plate Ep is shifted when the position adjusting table 32 moves, the position adjustment can hardly be performed. Therefore, the position adjusting table 32 may have a retention mechanism to retain the electrode plate Ep.

The retention mechanism can have a structure of sucking air to perform absorption (vacuum-absorption), for example, but this is not a limitation. In the position adjusting table 32, the position of the electrode plate Ep is adjusted. Therefore, it is controlled so that the electrode plates Ep are placed one by one on the position adjusting table 32.

The position adjustment of the electrode plate Ep is performed for the second conveying unit 332 that conveys the electrode plate Ep from the position adjusting table 32 to the table for stacking 21 at the first position P1. When the position adjustment of the electrode plate Ep is performed, it is performed based on the captured image data taken by the imaging unit for adjustment 34 disposed above the position adjusting table 32. The imaging unit for adjustment 34 takes an image of the electrode plate Ep placed on the position adjusting table 32, and sends the captured image data to the control unit 5. In order to facilitate the position adjustment, the imaging unit for adjustment 34 is preferably disposed at a position that enables to take an image in the normal direction from above the electrode plate Ep in the normal direction.

The captured image data taken by the imaging unit for adjustment 34 is sent to the control unit 5, and image processing thereof is performed by the processing circuit 51 of the control unit 5. Then, the processing circuit 51 calculates a movement amount of the position adjusting table 32, based on a position deviation between the appropriate position of the electrode plate Ep and the position of the electrode plate Ep in the captured image data. On the basis of the calculated movement amount, the control unit 5 moves the position adjusting table 32 so as to perform the position adjustment of the electrode plate Ep. Details of the position adjustment of the electrode plate Ep will be described later.

Conveying Unit 33

The conveying unit 33 conveys the electrode plate Ep to the table for stacking 21 at the first position P1. The conveying unit 33 includes the first conveying unit 331, the second conveying unit 332, and a connecting arm 333. The first conveying unit 331 conveys the electrode plate Ep, which has been conveyed and accumulated on the standby table 31, to the position adjusting table 32. The second conveying unit 332 conveys the electrode plate Ep after the position adjustment on the position adjusting table 32 to the upper part of the table for stacking 21 at the first position P1.

The first conveying unit 331 and the second conveying unit 332 have the same structure. The first conveying unit 331 and the second conveying unit 332 have the lower surface that can contact and hold the electrode plate Ep. The first conveying unit 331 and the second conveying unit 332 can have a structure, for example, including an absorption unit on the lower surface so as to hold the electrode plate Ep by absorption (vacuum absorption), but this is not a limitation.

Stacked Cell Separating Unit 4

Figure 9:
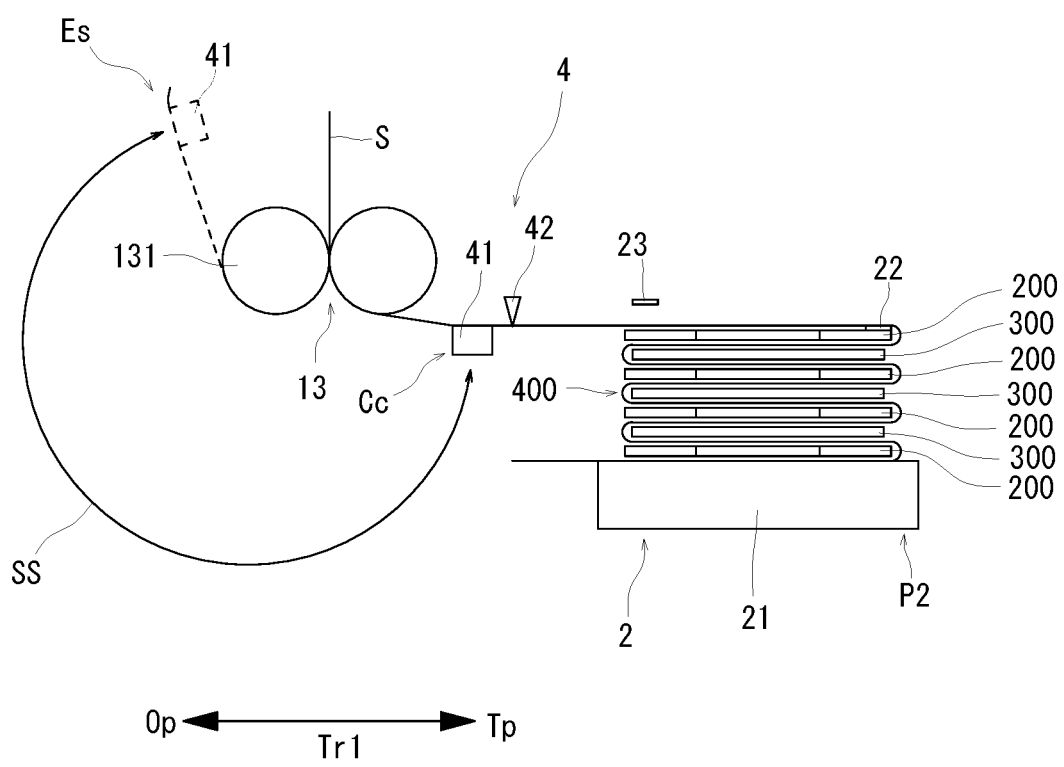
FIG. 9 is a layout diagram of a stacked cell separating unit.

FIG. 9 is a layout diagram of the stacked cell separating unit 4. The stacked cell separating unit 4 separates the stacked cell 400 after the stacking is completed on the table for stacking 21 from the tape-like separator S fed from the separator feed unit 1. The separated stacked cell 400 is taken out.

As illustrated in FIGS. 1, 3, and 9, the stacked cell separating unit 4 includes a separator holding unit 41, a separator cutting unit 42, and a stacked cell output unit 43 (see FIG. 1). The separator holding unit 41 can move between a standby position Es on the one side Op and a holding position Cc on the other side Tp, along an arc trajectory SS passing below the separator roller 13. Note that the separator holding unit 41 can be one that moves along a not-shown arc-shaped guide, for example, but this is not a limitation.

The trajectory SS of the separator holding unit 41 is not limited to the arc shape but may be a moving path having an elliptical arc shape, a hyperbolic shape, a linear shape, or the like, as long as the movement does not cause tension more than the normal value for the held separator S. As described above, the separator S is cut in the state held by the separator holding unit 41, and hence the end of the separator S after cutting can be a standby state at the standby position Es by the separator holding unit 41.

As exemplified in FIG. 9, the standby position Es is a position where the separator holding unit 41 does not interfere with stacking of the stacked body 500. Specifically, it is a position where the separator holding unit 41 does not interfere with the up and down movement of the roller pair 131, and it is a position outside the imaging angle of view of the imaging unit for checking 24.

Further, when the separator holding unit 41 is moved to the holding position Cc, it holds the lower surface of the separator S connecting to the stacked cell 400 on the table for stacking 21 at the second position P2. The separator holding unit 41 has a structure capable of absorbing (vacuum absorbing) the separator S with the surface contacting the separator S. Note that the holding method of the separator S by the separator holding unit 41 is not limited to the absorption (vacuum absorption), but it is possible to widely adopt a holding method that can hold the separator S without deforming or breaking the same.

The separator cutting unit 42 is disposed on the other side Tp. The separator cutting unit 42 can cut a part of the separator S between the part held by the separator holding unit 41 and the stacked cell 400 on the table for stacking 21 at the second position P2. Note that as the separator cutting unit 42, it is possible to widely adopt a cutting tool capable of separating the separator S in the conveyance direction.

The stacked cell separating unit 4 drives the separator holding unit 41 and the separator cutting unit 42. The stacked cell separating unit 4 operates according to instructions from the control unit 5. Only when the separator holding unit 41 holds the separator S after the stacking of the stacked cell 400 is completed, the stacked cell separating unit 4 operates the separator cutting unit 42 to cut the separator S.

The stacked cell output unit 43 is disposed on the other side Tp. After the separator cutting unit 42 cuts the separator S, the stacked cell 400 is taken out from the table for stacking 21 at the second position P2. The stacked cell output unit 43 takes out the stacked cell 400 in the width direction of the separator S, i.e. in the y direction. The stacked cell output unit 43 has a shape for holding the stacked cell 400 by the sides without protrusion of the terminal part 201 or 301 (see FIG. 1). However, without limiting to this, it may have a glove-like shape to grab the stacked cell 400 from above, for example.

The stacked cell manufacturing device 100 according to this embodiment has the structure described above. Next, operations of the stacked cell manufacturing device 100 is described with reference to the drawings.

Position Adjustment of Electrode Plate Ep

Figure 10:
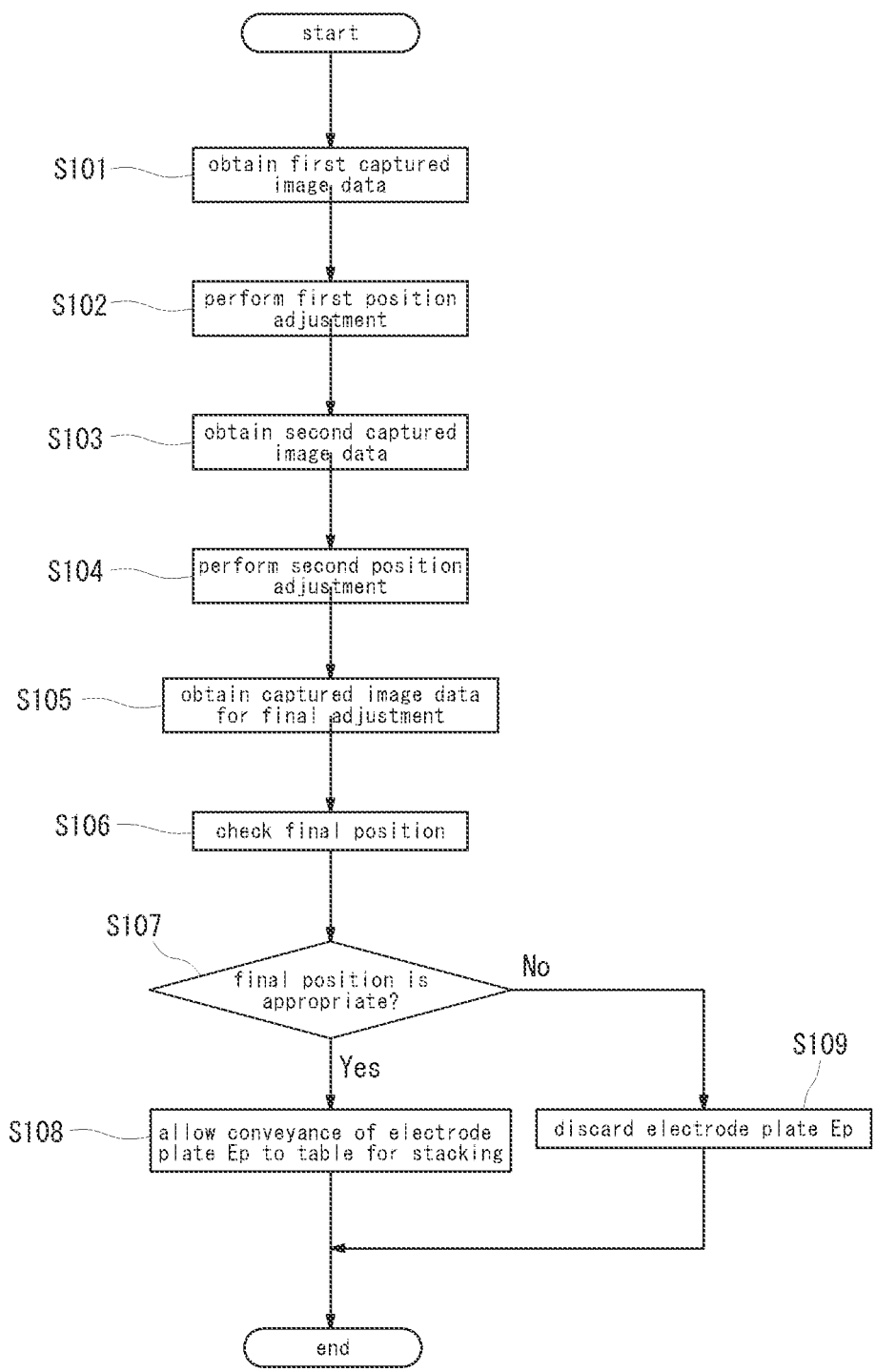
FIG. 10 is a flowchart illustrating a position adjusting operation of electrode plates.
Figure 11:
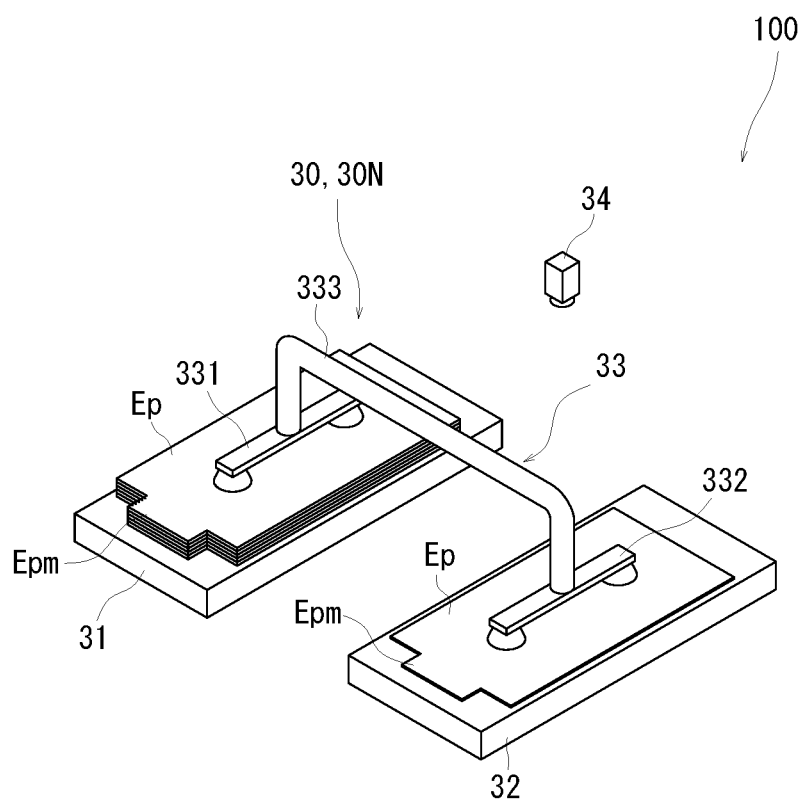
FIG. 11 is a perspective view illustrating a state where a first conveying unit holds the electrode plate on the standby table.
Figure 12:
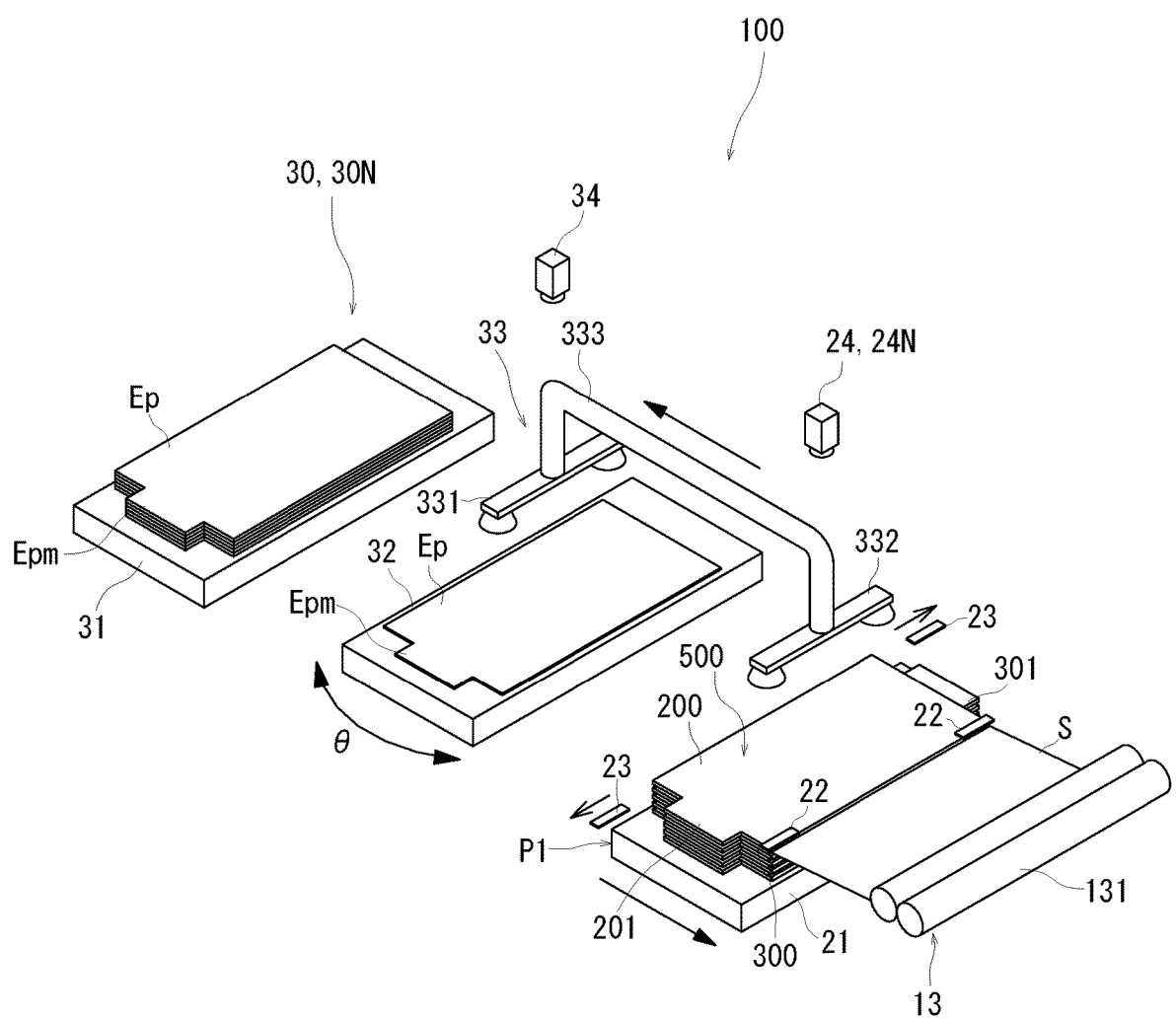
FIG. 12 is a perspective view just after the electrode plate is placed on the upper surface of the position adjusting table.
Figure 13:
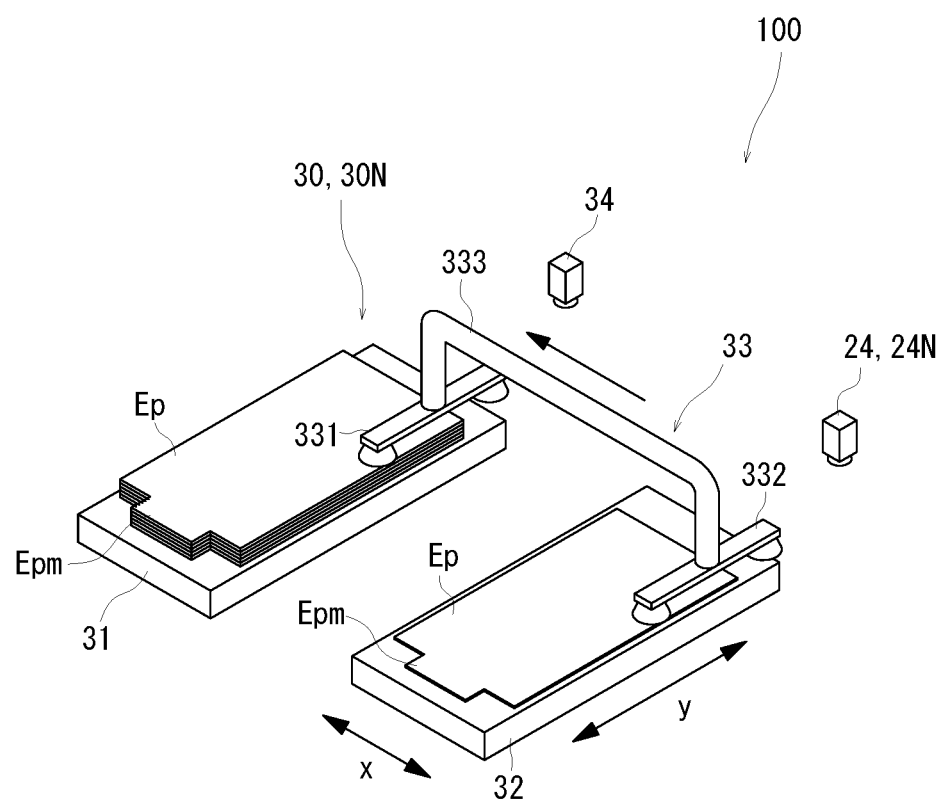
FIG. 13 is a perspective view illustrating a state where the first conveying unit is moving to fetch the electrode plate on the standby table.

First, the conveying operation to convey the electrode plate Ep accumulated on the standby table 31 to the table for stacking 21 at the first position P1 is described with reference to the drawings. FIG. 10 is a flowchart illustrating a position adjusting operation of the electrode plate Ep. FIG. 11 is a perspective view illustrating a state where the first conveying unit 331 holds the electrode plate Ep on the standby table 31. FIG. 12 is a perspective view just after placing the electrode plate Ep on the upper surface of the position adjusting table 32. FIG. 13 is a perspective view illustrating a state where the first conveying unit 331 is moving to fetch the electrode plate on the standby table 31.

As illustrated in FIG. 11, the first conveying unit 331 absorbs the electrode plate Ep accumulated on the standby table 31. In FIG. 11, the second conveying unit 332 absorbs the electrode plate Ep placed on the upper part of the position adjusting table 32, and this will be described later.

As illustrated in FIG. 8, the conveying unit 33 places the electrode plate Ep held by the first conveying unit 331 on the upper surface of the position adjusting table 32. Just after the electrode plate Ep is placed on the position adjusting table 32, the imaging unit for adjustment 34 takes an image of the electrode plate Ep placed on the position adjusting table 32, and the control unit obtains first captured image data (FIG. 10, Step S101).

During the period while the first conveying unit 331 moves to the standby table 31, the control unit 5 performs image processing and calculates the position deviation from the appropriate position of the electrode plate Ep, based on the position of the electrode plate Ep in the first captured image data, the edge information of the separator S from the edge detector 126, and the like. Further, on the basis of the calculation result, the control unit 5 performs a first position adjustment process to move the position adjusting table 32 (Step S102). As illustrated in FIG. 12, in the first position adjustment process, the position adjusting table 32 is moved in the rotation direction (θ direction). In the case of an elongated electrode plate Ep as the electrode plate Ep in this embodiment, if a position deviation occurs in the rotation direction, a position deviation of the end in the longitudinal direction increases. Therefore, in the first position adjustment process that is the adjustment in the first time, the position deviation in the θ direction is adjusted.

Further, after the first position adjustment is finished until the second conveying unit 332 holds the electrode plate Ep on the position adjusting table 32 (see FIG. 13), the imaging unit for adjustment 34 takes an image of the electrode plate Ep placed on the upper part of the position adjusting table 32. The control unit 5 obtains second captured image data from the imaging unit for adjustment 34 (Step S103). During the period while the second conveying unit 332 moves to the position adjusting table 32, the control unit 5 performs the image processing and calculates the position deviation from the appropriate position of the electrode plate Ep, based on the position of the electrode plate Ep in the second captured image data, the edge information of the separator S from the edge detector 126, and the like. Further, on the basis of the calculation result, the control unit 5 performs a second position adjustment process to move the position adjusting table 32 (Step S104).

As illustrated in FIG. 13, in the second position adjustment process, the position adjusting table 32 is moved in the lateral direction (x direction) and the longitudinal direction (y direction) of the electrode plate Ep. As described above, the position adjusting table 32 is moved in the θ direction in the first position adjustment process, and is moved in the x direction and the y direction in the second position adjustment process, but this is not a limitation.

When the first position adjustment process and the second position adjustment process are performed, the electrode plate Ep placed on the upper part of the position adjusting table 32 is positioned at an appropriate position for being placed on the table for stacking 21. Further, as illustrated in FIG. 11, the electrode plate Ep after the position adjustment in the θ direction, the x direction, and the y direction on the position adjusting table 32 is absorbed by the second conveying unit 332. When the second conveying unit 332 absorbs the electrode plate Ep, the imaging unit for adjustment 34 takes an image of the position adjusting table 32 with the electrode plate Ep. The control unit 5 obtains captured image data for final adjustment from the imaging unit for adjustment 34 (Step S105).

The control unit 5 checks a final position of the electrode plate Ep from the captured image data for final adjustment (Step S106). Note that the final position is the position of the electrode plate Ep held by the second conveying unit 332, and position adjustment on the position adjusting table 32 cannot be performed. Therefore, the control unit 5 checks whether or not the final position is an appropriate position (Step S107).

If the final position is an appropriate position (Yes in Step S107), as illustrated in FIG. 8, the control unit 5 operates the conveying unit 33 to convey the electrode plate Ep held by the second conveying unit 332 to the upper part of the stacked body 500, which is being stacked on the upper part of the table for stacking 21 at the first position P1 (Step S108). If the final position is not an appropriate position (No in Step S107), the control unit 5 discards the electrode plate Ep held by the second conveying unit 332 (Step S109). The electrode plate Ep may be discarded by being dropped between the position adjusting table 32 and the table for stacking 21 at the first position P1, for example, or an additional mechanism for discarding may be provided.

Note that this embodiment describes the case where a position deviation of the electrode plate Ep occurs, but this is not a limitation. For instance, the electrode plate Ep may be discarded also in a case where a variation in the shape or the size of the electrode plate Ep occurs. In this way, a performance variation in the manufactured stacked cells 400 can be suppressed. In other words, a decrease in yield of the stacked cell 400 can be suppressed.

Check of Stacking State of Stacked Body 500

Figure 14:
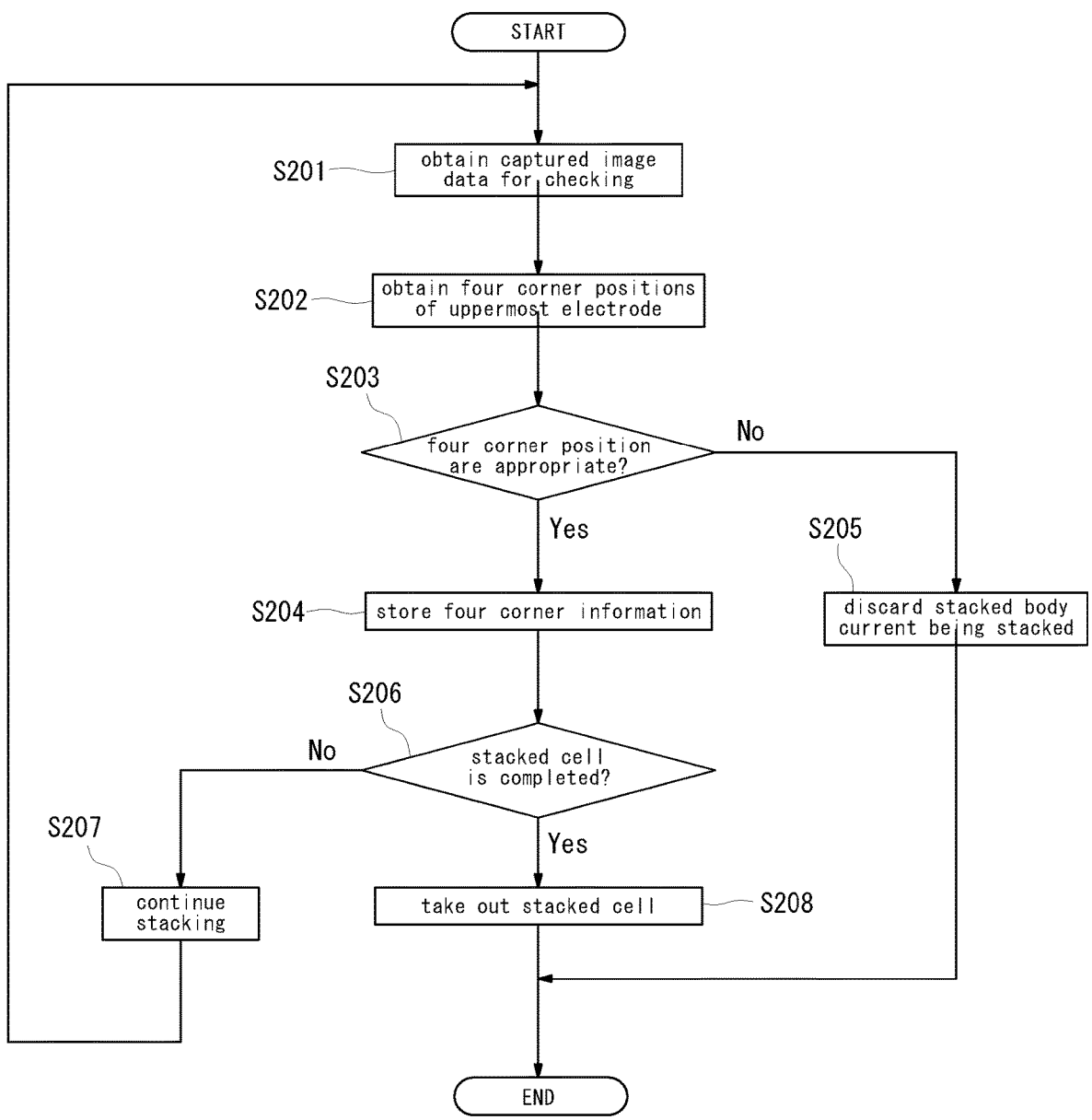
FIG. 14 is a flowchart illustrating a procedure for checking a position of the electrode plate with respect to a stacked body.
Figure 15:
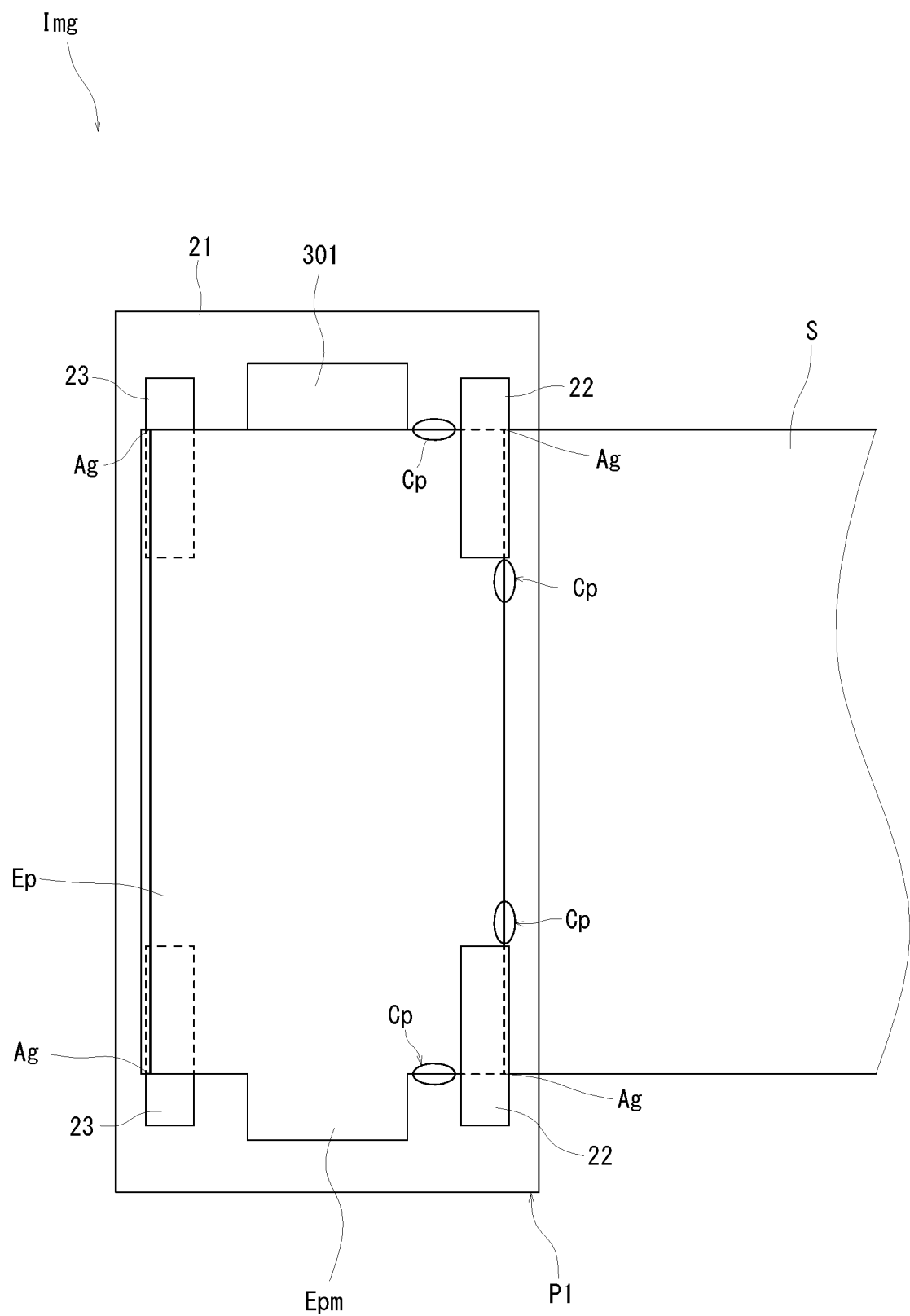
FIG. 15 is a diagram illustrating captured image data for checking taken by an imaging unit for checking.

Even if the position of the electrode plate Ep is adjusted as described above, a position deviation may occur when the second conveying unit 332 places the electrode plate Ep on the upper part of the stacked body 500. Therefore, in the stacked cell manufacturing device 100, the position of the electrode plate Ep placed on the upper part of the stacked body 500 that is currently being stacked with respect to the stacked body 500 may be checked by providing the imaging unit for checking 24 (24N). Hereinafter, the procedure for checking the position of the electrode plate Ep is described with reference to the drawings. FIG. 14 is a flowchart illustrating the procedure for checking the position of the electrode plate Ep with respect to the stacked body 500. FIG. 15 is a diagram illustrating the captured image data for checking Img taken by the imaging unit for checking 24N.

As illustrated in FIG. 8, the electrode plate Ep held by the second conveying unit 332 is placed on the upper part of the stacked body 500 placed on the upper part of the table for stacking 21 at the first position P1. At this time, the imaging unit for checking 24N takes an image of the upper part of the stacked body 500. The control unit 5 obtains the captured image data for checking Img from the imaging unit for checking 24N (Step S201). Then the control unit 5 performs image processing on the captured image data for checking Img so as to obtain positions of four corners Ag of the electrode plate Ep placed on the uppermost part (Step S202).

In the folding unit 2, when the electrode plate Ep is placed, the first claw part 22 promptly presses the upper part of the electrode plate Ep. Therefore, as illustrated in FIG. 15, when the imaging unit for checking 24N takes an image of the electrode plate Ep, the corners Ag of the electrode plate Ep on the other side Tp cannot be directly seen. Therefore, the control unit 5 checks positions of the detection parts Cp (four parts) near the first claw parts 22 on the short sides and the long side of the electrode plate Ep, in the captured image data for checking Img, and from these data, the control unit 5 calculates and obtains the position of the corner Ag.

In addition, the electrode plate Ep is placed on the upper part of the second claw part 23. Therefore, the electrode plate Ep is inclined, and hence recognized positions of the corners Ag of the electrode plate Ep on the one side Op may be not accurate positions. Therefore, normal corner positions are calculated, based on product dimension data in the xy direction obtained on the position adjusting table 32 and the data of the two corners Ag on the other side Tp obtained by the detection of the detection parts Cp.

The control unit 5 checks whether or not the four corners Ag of the electrode plate Ep are at appropriate positions (Step S203). If at least one of the corners Ag is not at the appropriate position (No in Step S203), the stacked body 500 that is currently being stacked is discarded (Step S205).

If the four corners Ag of the electrode plate Ep are at the appropriate positions (Yes in Step S203), information of the four corners is stored in the storage circuit 52 (Step S204).

After that, the control unit 5 checks whether or not the stacked cell 400 is completed (Step S206). If the stacked cell 400 is not completed (No in Step S206), the control unit 5 continues the stacking (Step S207). Note that, after continuing the stacking, the process returns to Step S201 so as to continue the checking of the stacking state. In addition, if the stacked cell 400 is completed (Yes in Step S206), the control unit 5 operates the stacked cell output unit 43 to take out the stacked cell 400 (Step S208).

As described above, the electrode plate Ep is used as the negative electrode plate 200 or the positive electrode plate 300 in the stacked body 500. The stacked cell 400 has rules such as that the positive electrode plate 300 is disposed inside the negative electrode plate 200 in a plan view. Therefore, if a part of the corners Ag of the electrode plate Ep to be the positive electrode plate 300 is outside the corner Ag of the negative electrode plate 200, it is determined that it is not at the appropriate position. In addition, if the corner Ag of the electrode plate Ep to be the negative electrode plate 200 is outside the predetermined position, the electrode plate Ep may be bent when the separator S is folded in a bellows shape. Therefore, as described above, it is checked whether or not the position of the electrode plate Ep is the appropriate position every time when the electrode plate Ep is disposed, and hence a performance variation in the manufactured stacked cells 400 can be suppressed.

Stacking Operation by Folding Unit 2 and Electrode Feed Unit 3

Figure 16:
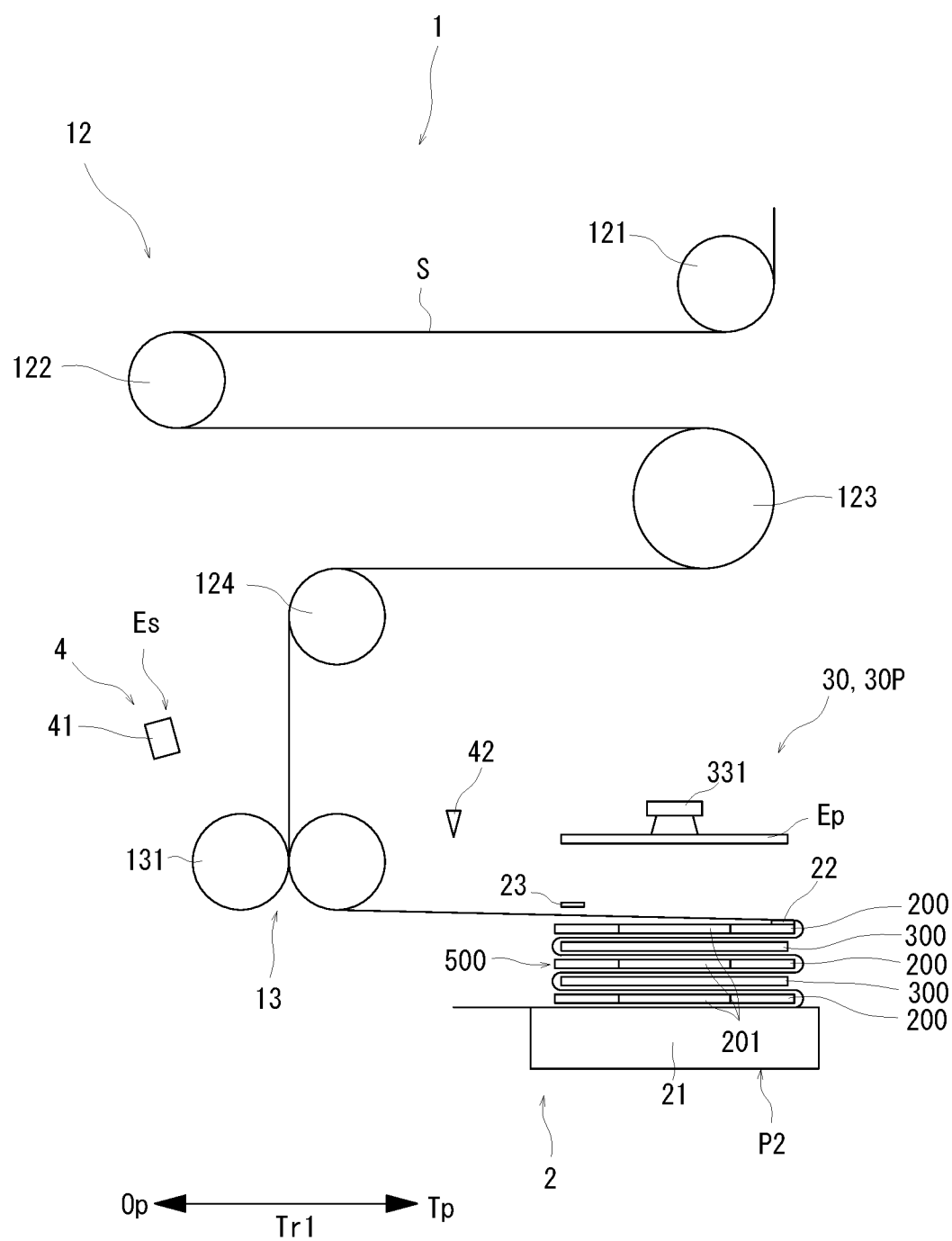
FIG. 16 is a diagram illustrating a state where a table for stacking is at a second position.
Figure 17:
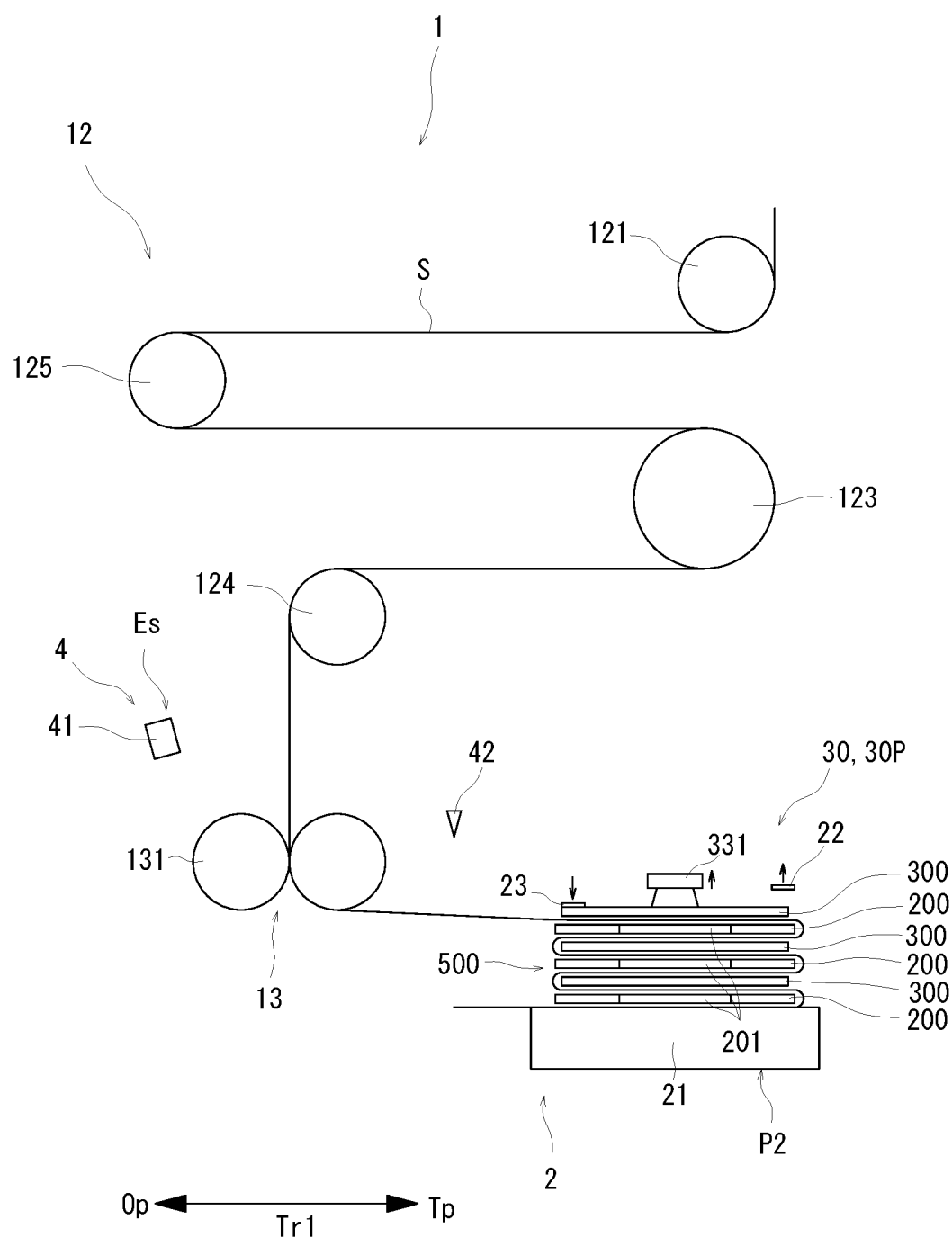
FIG. 17 is a diagram illustrating a state where the positive electrode plate is placed on the upper part and is pressed by a second claw part.
Figure 18:
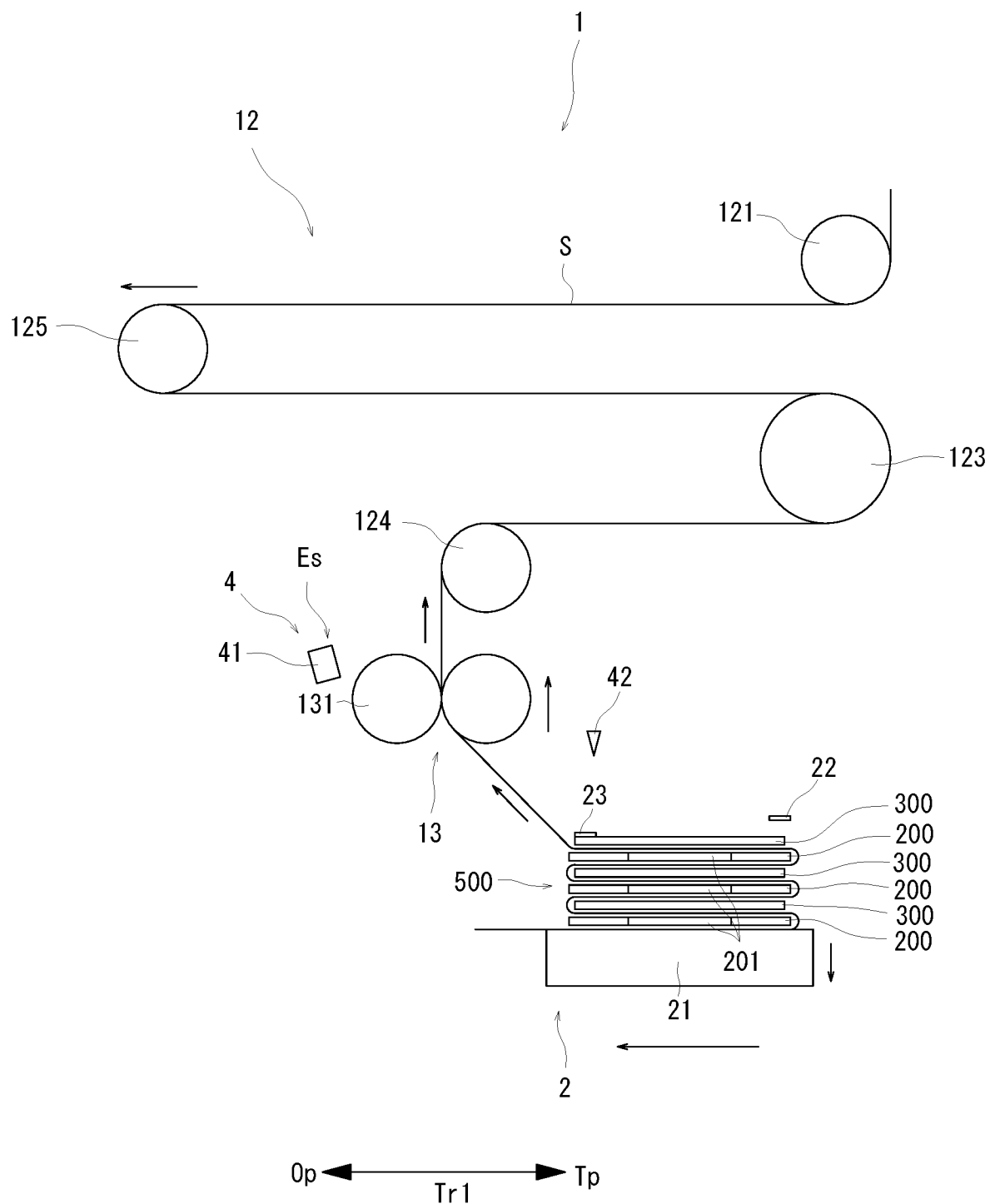
FIG. 18 is a diagram illustrating a state where the table for stacking is moving to one side.
Figure 19:
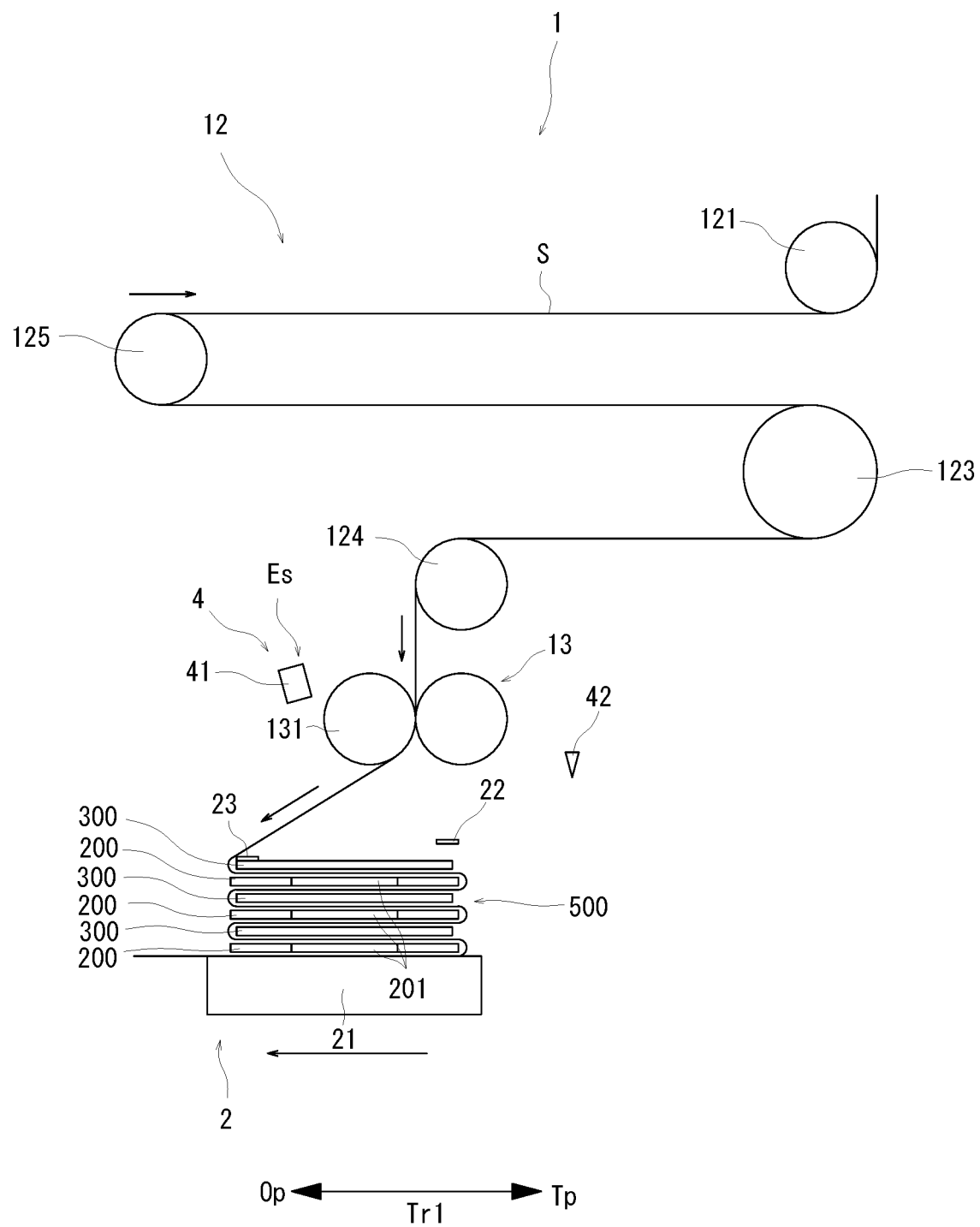
FIG. 19 is a diagram illustrating a state where the table for stacking is further moving to one side.
Figure 20:
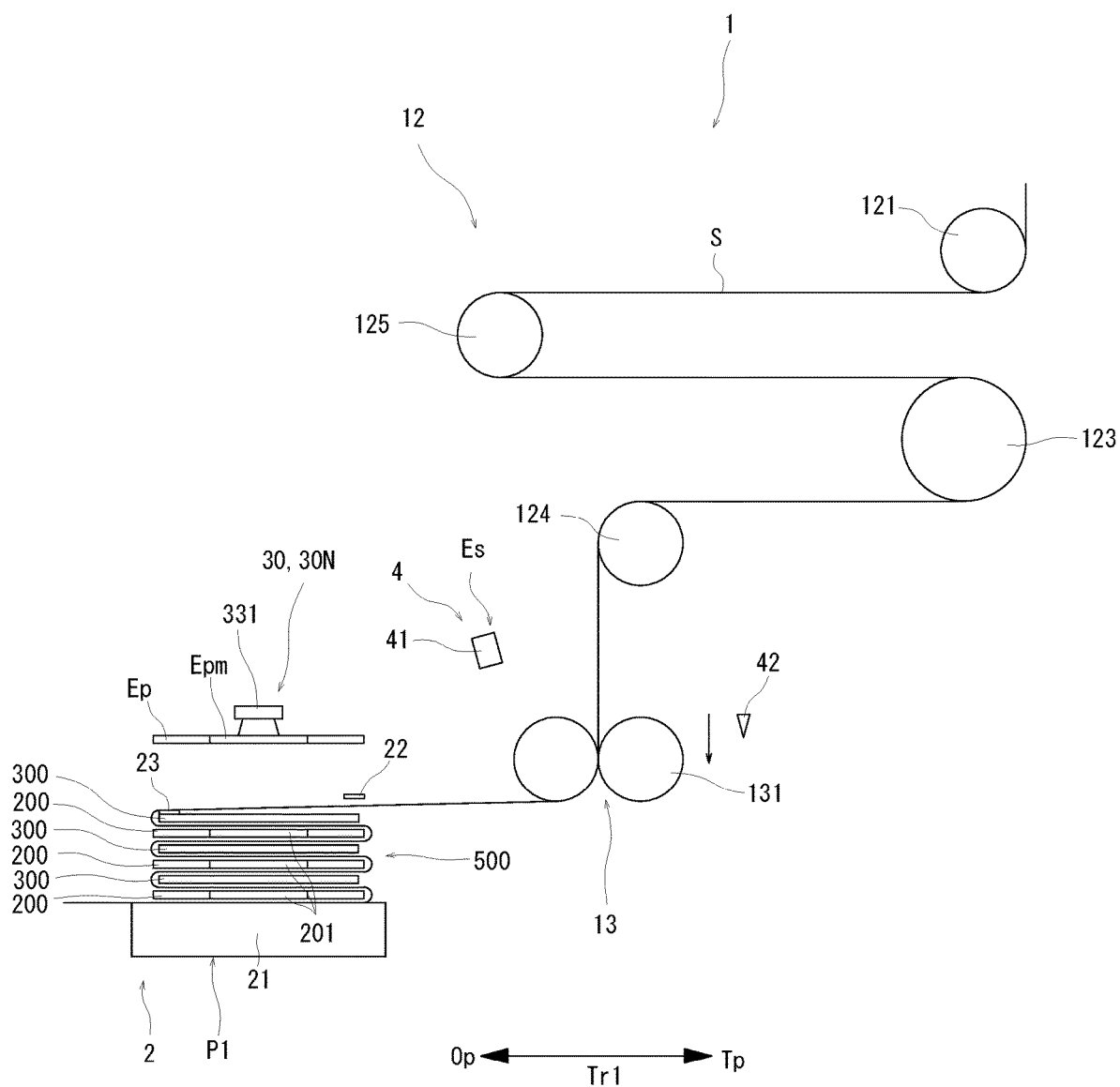
FIG. 20 is a diagram illustrating a state where the table for stacking is at a first position.
Figure 21:
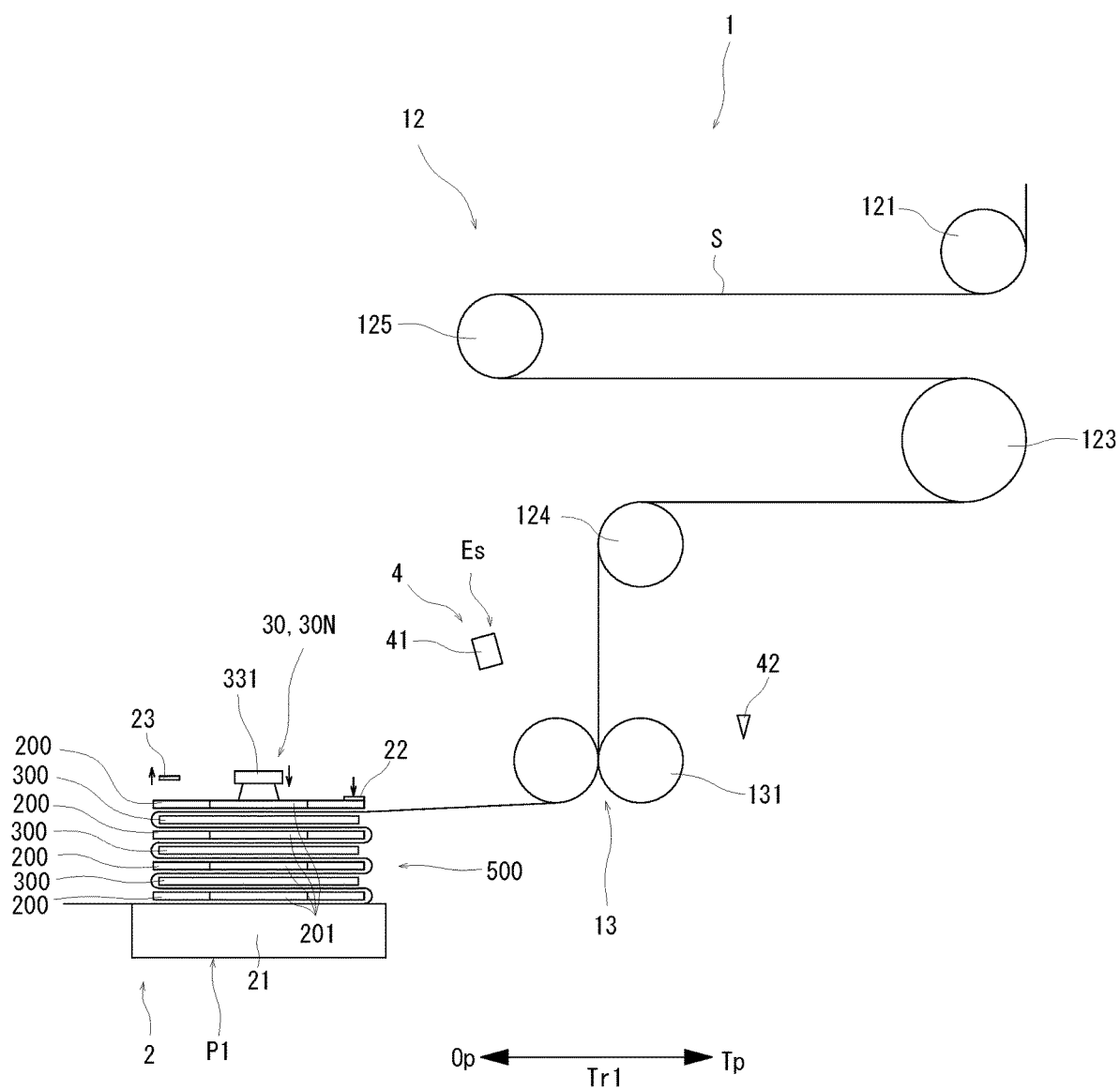
FIG. 21 is a diagram illustrating a state where the negative electrode plate is placed on the upper part and is pressed by a first claw part.

In the stacked cell manufacturing device 100, the folding unit 2 folds the separator S in a bellows shape, while the negative electrode plates 200 and the positive electrode plates 300 are disposed in the valley fold parts, so that the stacked cell 400 is manufactured. Here, operations of the folding unit 2 is described with reference to the drawings. FIG. 16 is a diagram illustrating a state where the table for stacking 21 is at the second position P2. FIG. 17 is a diagram illustrating a state where the positive electrode plate 300 is placed on the upper part and is pressed by the second claw part 23. FIG. 18 is a diagram illustrating a state where the table for stacking 21 is moving to the one side Op. FIG. 19 is a diagram illustrating a state where the table for stacking 21 is further moving to the one side Op. FIG. 20 is a diagram illustrating a state where the table for stacking 21 is at the first position P1. FIG. 21 is a diagram illustrating a state where the negative electrode plate 200 is placed on the upper part and is pressed by the first claw part 22.

As illustrated in FIG. 16, when the table for stacking 21 is at the second position P2, the negative electrode plate 200 is pressed by the first claw part 22. Further, the separator S is bent and folded at the first claw part 22. The roller pair 131 is disposed near the table for stacking 21 in the up and down direction. Therefore, it is possible to reduce the inclination angle of the separator S bent and folded at the first claw part 22. Note that depending on a position of the roller pair 131, the bent and folded separator S can be horizontal or substantially horizontal. In this way, the electrode plate Ep to the positive electrode plate 300 can be easily and accurately placed on the upper part of the bent and folded separator S (see FIG. 17).

In addition, as the roller pair 131 is disposed near the table for stacking 21 in the up and down direction, the bent and folded separator S can be horizontal or substantially horizontal. Therefore, the reciprocating movement of the table for stacking 21 can be short, and cycle time for manufacturing the stacked cell 400 can be reduced.

Further, after the electrode plate Ep is placed as the positive electrode plate 300 on the upper part, it is pressed by the second claw part 23, and the first claw part 22 is moved in the y direction and the z direction (the direction perpendicular to the x direction and the y direction). In this way, the first claw part 22 is pulled out from between the negative electrode plate 200 and the separator S (see FIG. 17).

When the positive electrode plate 300 is placed, the height of the stacked body 500 in the stacking direction is increased. In order that the conveying unit 33 of the electrode feed unit 3 can accurately convey the electrode plate Ep to the stacked body 500, the table for stacking 21 moves downward by a distance corresponding to the thickness of the positive electrode plate 300 (see FIG. 18)

Further, the control unit 5 controls the separator roller 13 to move the roller pair 131 upward. In this way, the roller pair 131 moves to a position that does not interfere with the table for stacking 21, the first claw part 22, or the second claw part 23. In this state, the table for stacking 21 moves to the one side Op (see FIG. 18). The table for stacking 21 can pass below the roller pair 131.

In addition, when the table for stacking 21 approaches to the roller pair 131, the length of the separator S from a contact part of the roller pair 131 to the stacked body 500 becomes short. In the separator conveying unit 12, the separator S can be pulled out from the separator roll Sr but cannot be returned to the same. Therefore, the control unit 5 controls the conveyance path adjustment unit 122 to move the movable roller 125 in the direction separating from the conveying roller 121, so as to adjust the length of the separator S.

In addition, the separator S is usually formed as a thin sheet. If the tension is low, it may be separated from the roller, and as a result, a wrinkle or twist may occur. In addition, if the tension is too high, the separator S may be torn or elongated. Therefore, the control unit 5 adjusts the rotation speed of the traction roller 123 so that the tension of the separator S can be within a certain range.

The control unit 5 controls the position of the movable roller 125 and the rotation speed of the traction roller 123. The conveyance path adjustment unit 122 and the traction roller 123 are the conveyance adjustment unit, while the position of the movable roller 125 and the rotation speed of the traction roller 123 are the control condition. The control condition is stored in the storage circuit 52 in advance. The control unit 5 reads out the control condition from the storage circuit 52, and controls the conveyance path adjustment unit 122 and the traction roller 123 based on the control condition. Note that, as the control unit 5 controls based on the control condition, the tension of the separator S is controlled to be within a certain range.

Further, the second claw part 23 moves to the one side Op via below the roller pair 131, and the separator S is bent at the second claw part 23. In this way, the separator S is folded at the positive electrode plate 300 placed on the upper part of the stacked body 500 (see FIG. 19).

As the table for stacking 21 is further moved to the one side Op, the length of the separator S from the nip of the roller pair 131 to the stacked body 500 is increased. In this case, the control unit 5 controls the movable roller 125 to approach the conveying roller 121 and adjusts the rotation speed of the traction roller 123. In this case, the separator S pulled out from the separator roll Sr is conveyed at a predetermined speed and is sent so that the tension can be within a certain range.

In addition, after the table for stacking 21 passes the roller pair 131, the roller pair 131 moves downward. In this way, also when the table for stacking 21 is at the first position P1, the separator S of the stacked body 500 bent and folded at the second claw part 23 becomes horizontal or substantially horizontal (see FIG. 20). Further, the electrode plate Ep to be the negative electrode plate 200 is conveyed to the upper part of the stacked body 500 placed on the upper part of the table for stacking 21 that has reached the first position P1.

After the electrode plate Ep to be the negative electrode plate 200 is placed on the upper part of the separator S on the upper surface of the stacked body 500, and after the first claw part 22 presses the corner on the other side Tp of the negative electrode plate 200, the second claw part 23 is pulled out in the y direction and the z direction (FIG. 21).

By repeating the procedure described above, the stacked cell 400 can be formed, in which the separator S is folded in a bellows shape (folded in zigzag), and the negative electrode plates 200 and the positive electrode plates 300 are alternately disposed in the valley fold parts. In this way, the roller pair 131 is moved up and down in synchronization with the movement of the table for stacking 21, and hence the inclination of the separator S on the upper part of the stacked body 500 can be reduced, so that the movement amount of the table for stacking 21 can be suppressed.

Tension Control of Separator S

As described above, it is preferred that the tension of the separator S is within a certain range. As described above, in the stacked cell manufacturing device 100, based on the given control condition, the tension of the separator S when it is conveyed at a certain speed is controlled to be within a certain range. The stacked cell manufacturing device 100 may have an individual difference, or a variation in composition of the separator S, and hence the tension may be varied even if the same control condition is used for the control. Therefore, the control unit 5 may have a learning mode for obtaining the control condition in the stacked cell manufacturing device 100.

Figure 22:
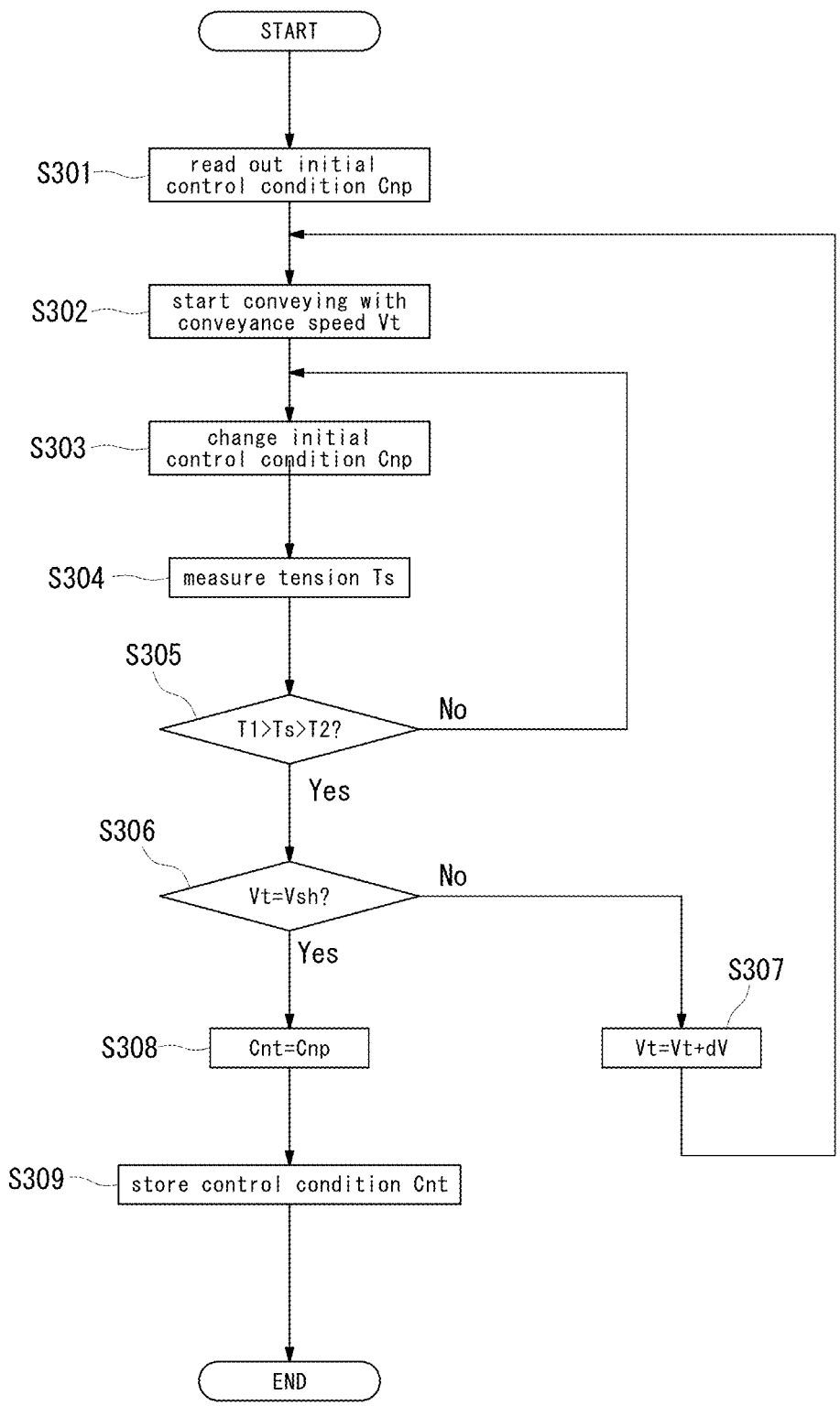
FIG. 22 is a flowchart illustrating an operation in a learning mode.

The learning mode is described below with reference to the drawings. FIG. 22 is a flowchart illustrating operations in the learning mode.

The control unit 5 reads out given initial control condition Cnp from the storage circuit 52 (Step S301). Similarly to the control condition described above, the initial control condition Cnp is the condition to determine the position of the movable roller 125 and the rotation speed of the traction roller 123. The initial control condition Cnp may be provided in advance, or if the stacked cell manufacturing device 100 is operated before, the stored control condition may be used as the initial control condition Cnp. The initial control condition Cnp is preferably such a condition that the tension of the separator S does not become too high.

Further, the control unit 5 controls to convey the separator S at a conveyance speed Vt (Step S302). Note that the control unit 5 can control the separator feed unit 1 to change the conveyance speed step by step. When the learning mode is started, the conveyance speed Vt is set to the slowest speed of the conveyance speed that is set step by step.

The control unit 5 changes the initial control condition Cnp (Step S303). For instance, the position of the movable roller 125 is adjusted, or the rotation speed of the traction roller 123 is adjusted. In this case, the tension Ts of the separator S is measured by the tension measuring unit 124 (Step S304).

The control unit 5 checks the tension Ts from the tension measuring unit 124 and whether or not the tension is within a determined range (Step S305). If the tension Ts is not within the determined range (No in Step S305), the control unit 5 returns to the step for changing the initial control condition Cnp (Step S303), and changes the initial control condition Cnp.

If the tension Ts is within the determined range (Yes in Step S305), the control unit 5 determines whether or not the current conveyance speed Vt is a predetermined conveyance speed Vsh (Step S306). Note that the conveyance speed is changed step by step, and hence the conveyance speed Vt is changed to be the predetermined conveyance speed Vsh. However, if the conveyance speed varies continuously, it may be possible to determine whether or not the conveyance speed Vt has exceeded the conveyance speed Vsh in Step S305.

If the conveyance speed Vt is not the predetermined conveyance speed Vsh (No in Step S306), the control unit 5 increases the conveyance speed Vt by one step (Step S307), and restarts the operation with the new conveyance speed Vt (Step S302).

If the conveyance speed Vt becomes the predetermined conveyance speed Vsh (Yes in Step S306), the control unit 5 sets the current initial control condition Cnp to the control condition Cnt (Step S308). Further, the control unit 5 stores the control condition Cnt in the storage circuit 52 (Step S309).

In this way, when the control unit 5 has the learning mode, it is possible to use the control condition Cnt optimized for each stacked cell manufacturing device 100, and hence deterioration in accuracy of the stacked cell 400 can be suppressed.

Note that the learning mode may be executed when shipping the stacked cell manufacturing device 100, or when replacing the separator roll Sr, or when replacing a member such as the conveying roller 121. In addition, it may be executed when yield of the stacked cell manufacturing device 100 is decreased. The learning mode may be readily executed by a user, or may be executed only by a person who can perform maintenance.

Figure 23:
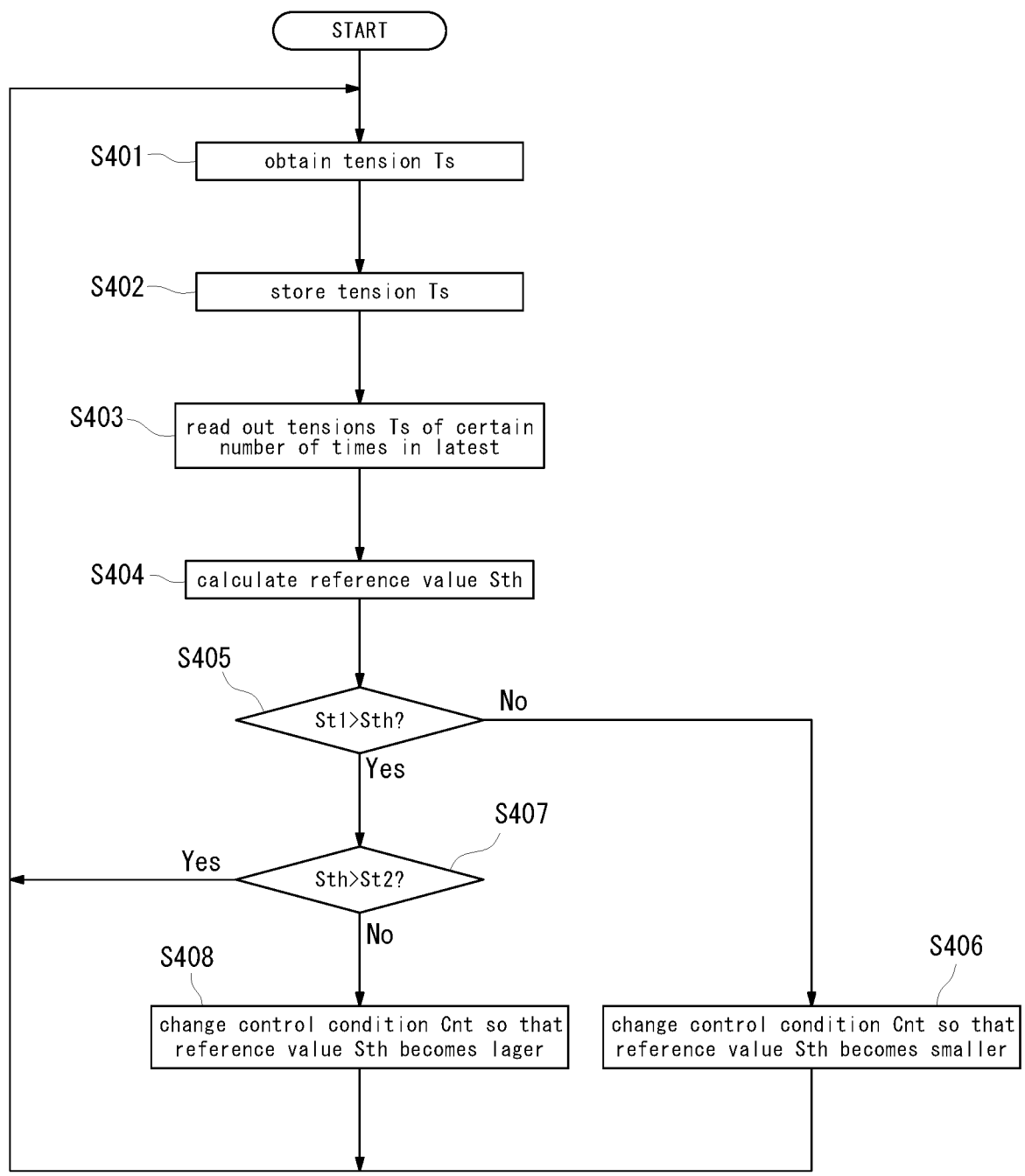
FIG. 23 is a flowchart illustrating tension control of the separator.

Another example of the tension control of the separator S is described with reference to the drawings. FIG. 23 is a flowchart illustrating the tension control of the separator S.

In the tension control illustrated in FIG. 23, the control unit 5 obtains the tension Ts from the tension measuring unit 124 at every predetermined timing (e.g., every certain period, every certain length of the fed separator S, or the like) (Step S401). The control unit 5 stores the obtained tensions Ts in time series in the storage circuit 52 (Step S402). The control unit 5 stores the tensions Ts and reads out a certain number of times of tensions Ts in the latest (Step S403). On the basis of data of the read tensions Ts, the control unit 5 calculates a reference value Sth (Step S404). The reference value Sth can be an arithmetic mean, a standard deviation, a moving average, or the like, but this is not a limitation.

The control unit 5 checks whether or not the reference value Sth is smaller than a maximum value St1 of a predetermined range (Step S405). If the reference value Sth is larger than the maximum value St1 (No in Step S405), the control unit 5 changes the control condition Cnt so that the reference value Sth becomes smaller the same (Step S406). Further, the control unit 5 returns to Step S401 and obtains the tension Ts.

If the reference value Sth is smaller than the maximum value St2 (Yes in Step S405), the control unit 5 checks whether or not the reference value Sth is larger than a minimum value St2 of the predetermined range (Step S407).

If the reference value Sth is larger than the minimum value St2 (Yes in Step S407), the control unit 5 returns to Step S401 without changing the control condition, and obtains the tension Ts. If the reference value Sth is the minimum value St2 or smaller (No in Step S407), the control unit 5 changes the control condition Cnt so that the reference value Sth becomes larger than the same (Step S408). Further, the control unit 5 returns to Step S401 and obtains the tension Ts.

In this way, the control unit 5 changes the control condition based on the measured tensions Ts, and with this structure the stacked cell manufacturing device 100 can stably produce the stacked cells. In addition, characteristics of the separator roll Sr may be different between start and end of winding. By performing the tension control based on the measured tensions Ts, it is possible to cope with a variation in characteristics of the separator roll Sr.

Figure 24:
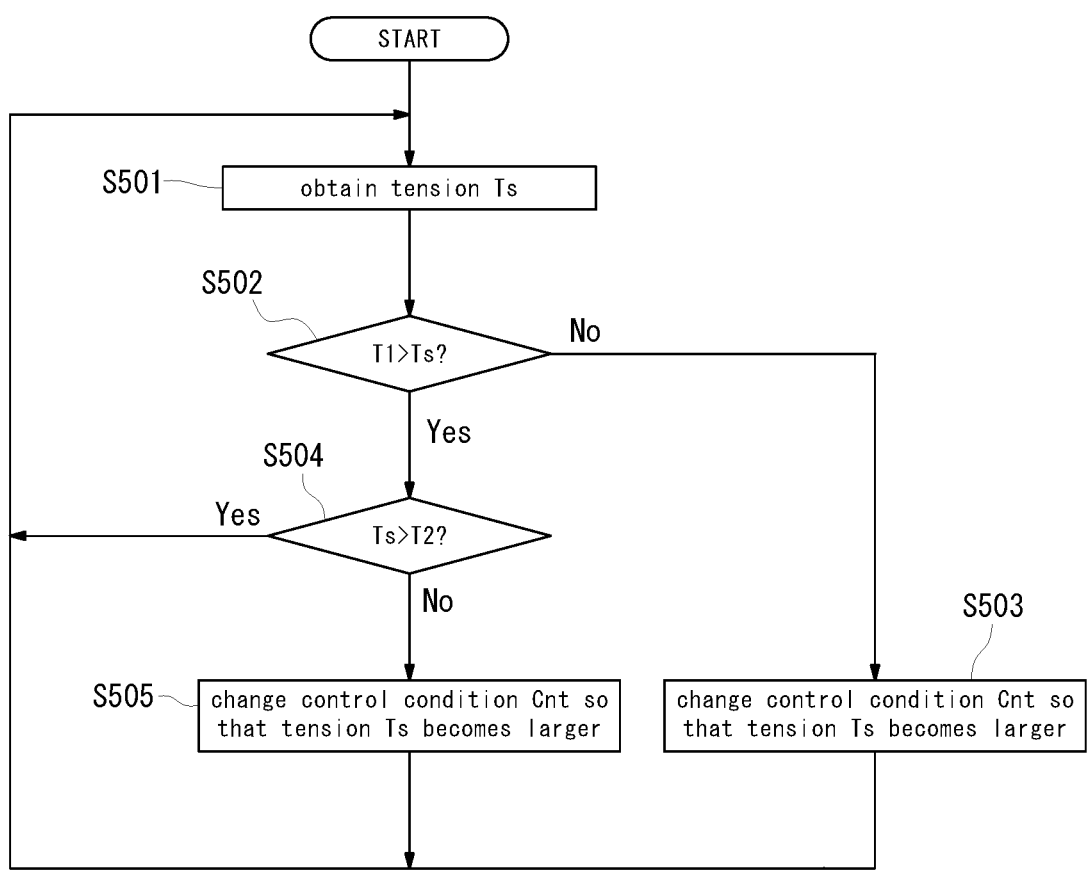
FIG. 24 is a flowchart illustrating the tension control of the separator.

Still another example of the tension control of the separator S is described with reference to the drawings. FIG. 24 is a flowchart illustrating the tension control of the separator S.

In the tension control illustrated in FIG. 24, the control unit 5 obtains the tension Ts from the tension measuring unit 124 at every predetermined timing (e.g., every certain period, every certain length of the fed separator S, or the like) (Step S501).

The control unit 5 checks whether or not the tension Ts is smaller than a maximum value T1 of a predetermined range (Step S502). If the tension Ts is larger than the maximum value T1 (No in Step S502), the control unit 5 changes the control condition Cnt so that the tension Ts becomes smaller than the same (Step S503). Further, the control unit 5 returns to Step S501 and obtains the tension Ts.

If the tension Ts is smaller than the maximum value T1 (Yes in Step S502), the control unit 5 checks whether or not the tension Ts is larger than a minimum value T2 of the predetermined range (Step S504).

If the tension Ts is larger than the minimum value T2 (Yes in Step S504), the control unit 5 returns to Step S501 without changing the control condition and obtains the tension Ts. If the tension Ts is the minimum value T2 or smaller (No in Step S504), the control unit 5 changes the control condition Cnt so that the tension Ts becomes larger than the same (Step S505). Further, the control unit 5 returns to Step S501 and obtains the tension Ts.

The control unit 5 performs real time control using the current measured tension Ts. Performing this real time control, it is possible to promptly cope with a malfunction of the device, or an emergent change of the separator S.

Separating Process of Stacked Cell

Figure 25:
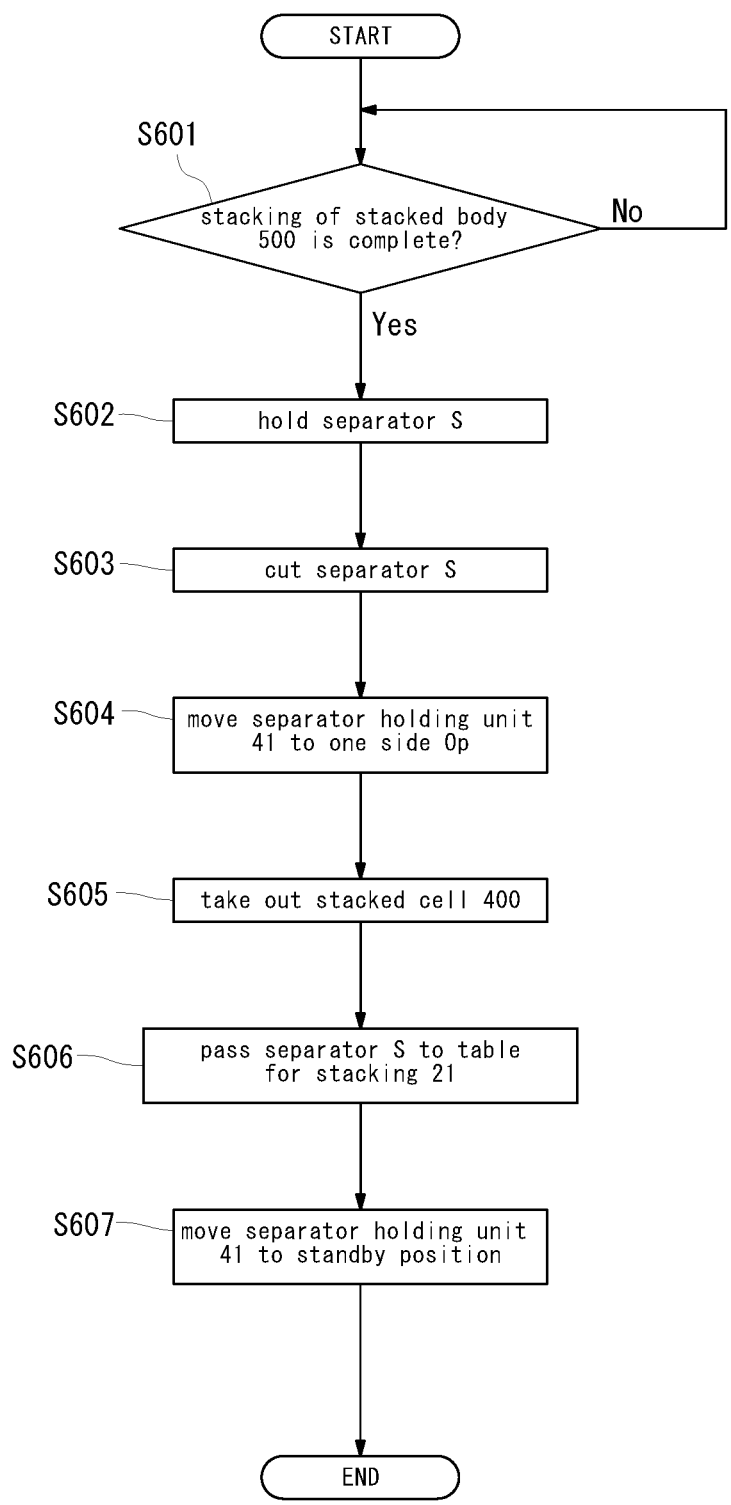
FIG. 25 is a flowchart illustrating a separating process of the stacked cell.
Figure 26:
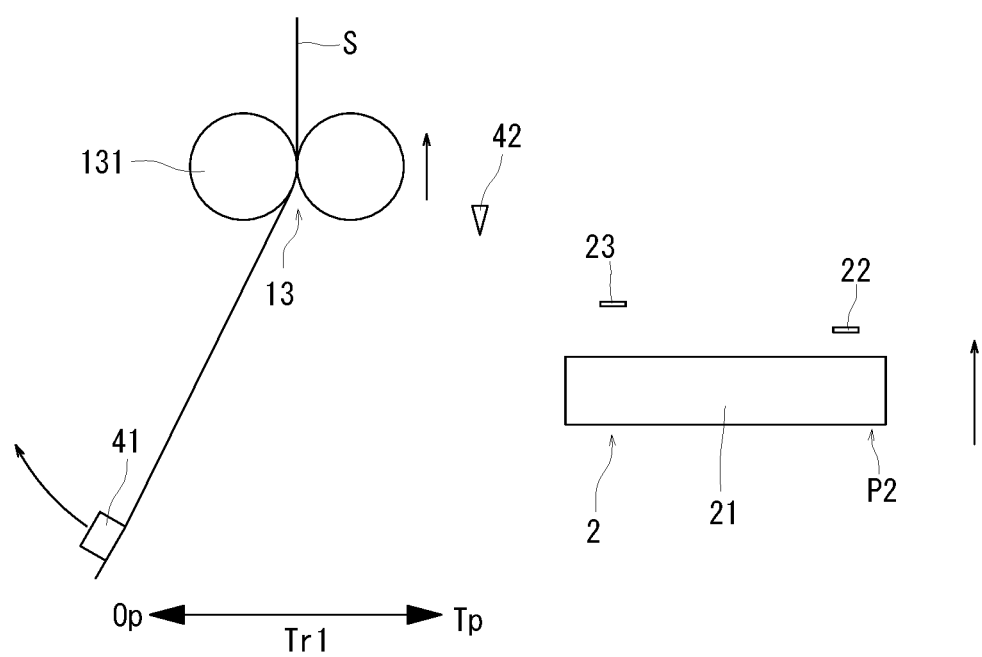
FIG. 26 is a diagram illustrating a moved state of a separator holding unit after cutting.
Figure 27:
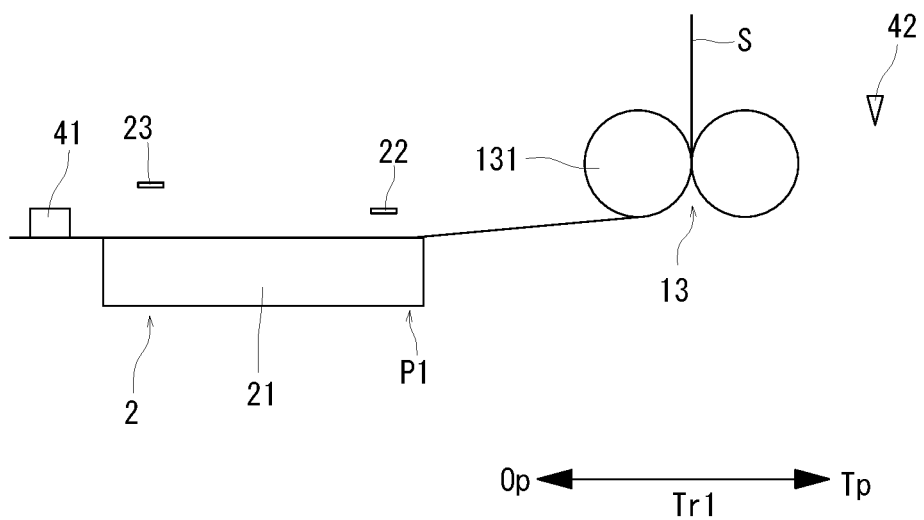
FIG. 27 is a diagram illustrating a state where the separator holding unit has passed the separator to the table for stacking.
Figure 28:
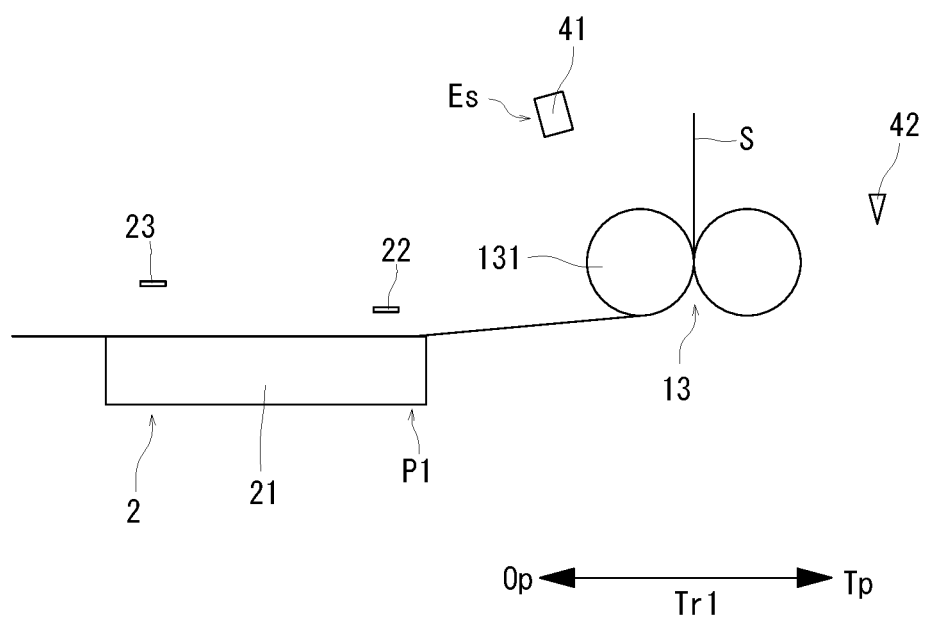
FIG. 28 is a diagram illustrating the table for stacking moved to the first position.

There is described a separating process to separate the stacked cell 400 after completion of stacking from the separator S that is being conveyed, with reference to the drawings. FIG. 25 is a flowchart illustrating the separating process of the stacked cell 400. FIG. 26 is a diagram illustrating a moved state of the separator holding unit 41 after cutting. FIG. 27 is a diagram illustrating a state where the separator S is passed from the separator holding unit 41 to the table for stacking 21. FIG. 28 is a diagram illustrating the table for stacking 21 that is moved to the first position P1.

In the stacked cell manufacturing device 100 described above, the stacked cell 400 is produced by the movement of the table for stacking 21. The stacked cell 400 has the stacking structure as an example, in which the lowermost and uppermost layers are the negative electrode plates 200, and the separator S is disposed under the lowermost negative electrode plate 200 and over the uppermost negative electrode plate 200. However, this stacking structure is not a limitation.

In addition, in the structure exemplified in FIG. 9, the separator S is disposed over the negative electrode plate 200 when the table for stacking 21 is at the second position P2. Therefore, when the table for stacking 21 is at the second position P2, the stacking of the stacked cell 400 is completed, but the stacking form is not limited to this.

The control unit 5 checks whether or not the stacking of the stacked body 500 is completed when the table for stacking 21 is a the second position P2 (Step S601). The completion of the stacking of the stacked body 500 can be checked, for example, based on the number of reciprocating movements of the table for stacking 21, the conveyance length of the separator S, or the like, but this is not a limitation. If the stacking of the stacked body 500 is not completed (No in Step S601), the control unit 5 monitors the stacking of the stacked body 500 until the stacking of the stacked body 500 is completed (repeats Step S601).

When the stacking of the stacked body 500 is completed (Yes in Step S601), the control unit 5 sends an instruction to the stacked cell separating unit 4 to move the separator holding unit 41 to the holding position Cc. As illustrated in FIG. 9, the separator holding unit 41 absorbs and holds the bottom surface of the separator S at the part between the roller pair 131 and the stacked body 500 (Step S602).

While the separator holding unit 41 holds the separator S, the part of the separator S between the separator holding unit 41 and the stacked body 500 keeps a tension within a certain range. In this state, the control unit 5 sends an instruction to the stacked cell separating unit 4 to drive the separator cutting unit 42, and hence the separator S is cut at a part between the separator holding unit 41 and the table for stacking 21 (Step S603). Note that "at a part between the separator holding unit 41 and the table for stacking 2" includes on the separator holding unit 41. Therefore, "the separator S is cut at a part between the separator holding unit 41 and the table for stacking 2" includes being cut on the separator holding unit 41.

As illustrated in FIG. 26, the control unit 5 sends an instruction to the stacked cell separating unit 4 to move the separator holding unit 41 to the one side Op (Step S604). In addition, as illustrated in FIG. 26, the roller pair 131 is moved upward so that the table for stacking 21 can move to the one side Op. The separator holding unit 41 is disposed at a position such that the table for stacking 21 can contact with the separator S when the table for stacking 21 is moved to the one side Op.

The control unit 5 drives the stacked cell output unit 43 to take out the stacked cell 400 on the table for stacking 21 (Step S605). After the stacked cell 400 is taken out, the control unit 5 moves the table for stacking 21 to the one side Op. Further, it passes the separator S from the separator holding unit 41 to the table for stacking 21 (Step S606). Further, as illustrated in FIG. 28, when the table for stacking 21 moves to the first position P1, the control unit 5 sends an instruction to the stacked cell separating unit 4 to move the separator holding unit 41 to the standby position Es (Step S607).

As described above, the separator holding unit 41 holds the separator S, and hence the separator S can be securely cut. In addition, even if a thin type of the separator S is used, as the leading end of the cut separator S is held by the separator holding unit 41, movement of the leading end of the cut separator S can be controlled, and it can be securely passed to the table for stacking 21.

Automatic Connection of Separator S

In the separator feed unit 1, the separators S pulled out from the two separator rolls Sr are fed to the connecting unit 14. Further, when remaining amount of one of the separator rolls Sr becomes small, the connecting unit 14 connects the rear end of the separator S pulled out from the one separator roll Sr to the leading end of the separator S pulled out from the other separator roll Sr.

Figure 29:
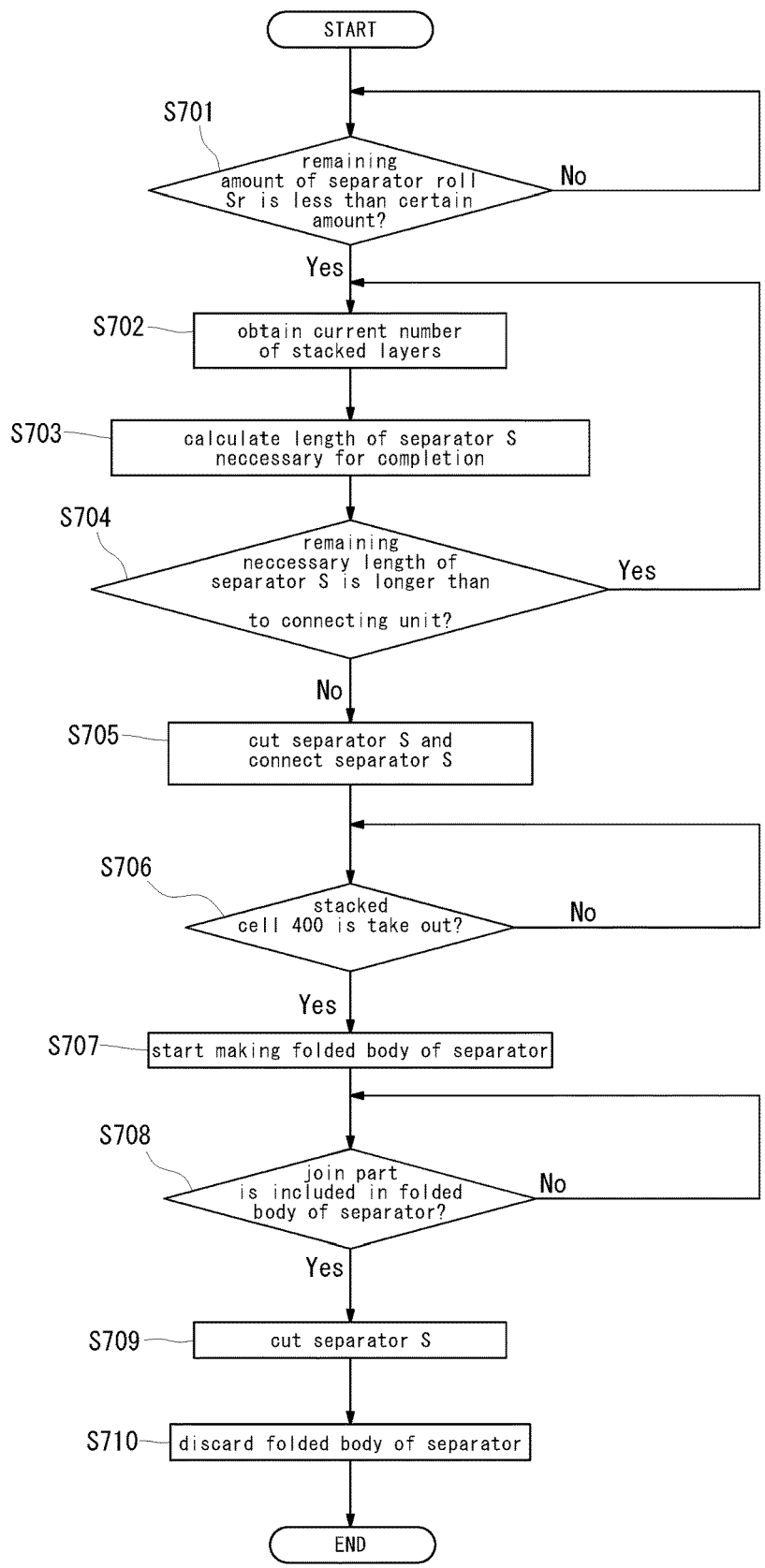
FIG. 29 is a flowchart illustrating a separator connecting operation.

In the stacked type battery Bp, if a joint part of the separator S is included in the stacked cell 400, it may cause a malfunction of the stacked cell 400, and it is preferred that the joint part is not included in the stacked cell 400. Therefore, the stacked cell manufacturing device 100 adopts a method for excluding the joint part from the stacked cell 400 when the separators S are connected. Hereinafter, connection of the separators S is described with reference to the drawings. FIG. 29 is a flowchart illustrating the connecting operation of the separators S.

The control unit 5 detects the remaining amount of the separator S from the separator remaining amount detector 111. The control unit 5 checks whether or not the remaining amount of the separator roll Sr from which the separator S is currently pulled out is less than a certain amount, from the separator remaining amount detector 111 (Step S701). If the remaining amount of the separator roll Sr is the certain amount or more (No in Step S701), it obtains the remaining amount of the separator roll Sr (repeats Step S701).

If the remaining amount of the separator roll Sr becomes less than the certain amount (Yes in Step S701), the control unit 5 obtains the current number of stacked layers in the stacked body 500 (Step S702). Further, the control unit 5 calculates length of the separator S necessary for completing the stacked cell 400 (Step S703).

The control unit 5 checks whether or not the length of the separator S necessary for completing the stacked cell 400 is longer than the path from the stacked body 500 to the connecting unit 14 (Step S704). If the length of the separator S necessary for completing the stacked cell 400 is longer than the path from the stacked body 500 to the connecting unit 14 (Yes in Step S704), the process returns to Step S702.

If the length of the separator S necessary for completing the stacked cell 400 is shorter than the path from the stacked body 500 to the connecting unit 14 (No in Step S704), the control unit 5 sends an instruction to the connecting unit 14 to cut the currently conveyed separator S, and to connect it to the separator S pulled out from the remaining separator roll Sr (Step S705).

The control unit 5 checks whether or not the stacked cell 400 is completed and is taken out (Step S706). The control unit 5 waits until the stacked cell 400 is taken out (If No in Step S706, Step S706 is repeated). If the stacked cell 400 is taken out (Yes in Step S706), the control unit 5 stops the electrode feed unit 3, and drives the separator feed unit 1 and the folding unit 2, so as to make a folded body of only the separator S folded in a bellows shape (Step S707).

Every time when the table for stacking 21 moves to and fro, the control unit 5 manages whether or not the joint part of the separator S is included in the folded body based on the length of the separator S (Step S708). The control unit 5 waits until the joint part of the separator S is included in the folded body (If No in Step S708, Step S708 is repeated).

Further, if the joint part is included in the folded body (Yes in Step S708), the control unit 5 sends an instruction to the stacked cell separating unit 4 to cut the separator S (Step S709). Further, the folded body on the table for stacking 21 is discarded (Step S710).

By connecting the separator S as described above, the separator roll Sr from which the separator S is pulled out can be securely switched, and accuracy of the stacked cell 400 can be maintained.

Although the embodiment of the present invention is described above, the present invention is not limited to this description. In addition, the embodiment of the present invention can be variously modified without deviating from the spirit of the invention.

LIST OF REFERENCE SIGNS

- 100 manufacturing device
- 200 negative electrode plate
- 201 terminal part
- 300 positive electrode plate
- 301 terminal part
- 400 stacked cell
- 500 stacked body
- 1 separator feed unit
- 2 folding unit
- 3 electrode feed unit
- 4 stacked cell separating unit
- 5 control unit
- 11 separator roll attachment unit
- 111 separator remaining amount detector
- 12 separator conveying unit
- 121 conveying roller
- 122 conveyance path adjustment unit
- 123 traction roller
- 124 tension measuring unit
- 125 movable roller
- 13 separator roller
- 131 roller pair
- 14 connecting unit
- 21 table for stacking
- 211 table moving unit for stacking
- 22 first claw part
- 23 second claw part
- 24 imaging unit for checking
- 24N imaging unit for checking
- 24P imaging unit for checking
- 30 electrode plate feed unit
- 30N electrode plate feed unit
- 30P electrode plate feed unit
- 31 standby table
- 32 position adjusting table
- 33 conveying unit
- 331 first conveying unit
- 332 second conveying unit
- 333 connecting arm
- 34 imaging unit for adjustment
- 35 conductive sheet conveying unit
- 351 conductive sheet roll attachment unit
- 36 electrode cutting unit
- 361 fixed blade
- 3611 fixed cutting blade
- 362 rotary blade
- 3621 rotary cutting blade
- 363 rotary blade moving unit
- 364 first conveying roller unit
- 3641 lower roller
- 3642 upper roller
- 365 second conveying roller unit
- 3651 lower roller
- 3652 upper roller
- 366, 367, 368 conveying roller unit
- 37 notch forming unit
- 371 notching mold
- 372 edge detector
- 373 mold moving unit
- 374 die
- 375 punch
- 381 conveyor
- 382 cleaner
- 41 separator holding unit
- 42 separator cutting unit
- 43 stacked cell output unit
- 51 processing circuit
- 52 storage circuit
- Ag corner
- Bp stacked type battery
- Cc holding position
- Cnp initial control condition
- Cnt control condition
- Cp detection part
- Cs case
- Ct lid
- Ep electrode plate
- Epm protrusion
- Es standby position
- Nt notch
- Op one side
- P1 first position
- P2 second position

The invention claimed is:

1. A stacked cell manufacturing device arranged to manufacture a stacked cell in which negative electrode plates and positive electrode plates are alternately disposed and stacked in valley fold parts of a bellows-shaped folded separator, the device comprising:
a separator feed unit having a separator roller;
a folding unit including a table for stacking that holds the separator and moves in a reciprocating manner between one side and the other side with respect to the separator roller, so as to fold the separator in a bellows shape;
an electrode feed unit arranged to feed the negative electrode plates and the positive electrode plates alternately to the separator folded in the bellows shape by the folding unit;
a separator holding unit arranged to hold the separator fed from the separator roller;
a separator cutting unit arranged to cut the separator held by the separator holding unit; and
a control unit, wherein
stacking of the stacked cell is finished when the table for stacking is on the other side, and
after the stacking of the stacked cell is finished, the control unit performs a cutting process including allowing the separator cutting unit to cut the separator between the separator holding unit and the table for stacking in a state where the separator holding unit holds a lower surface of the separator between the separator roller and the table for stacking, moving the separator holding unit from below the separator roller to the one side to be a standby state, and then allowing to pass the separator to an upper surface of the table for stacking when the completed stacked cell is removed and the table for stacking moves to the one side.

2. The stacked cell manufacturing device according to claim 1, wherein the separator holding unit absorbs and holds the separator.

3. The stacked cell manufacturing device according to claim 1, wherein
the electrode feed unit includes two electrode plate feed units, and
one of the electrode plate feed units is disposed on the one side so as to feed the electrode plate to be the negative electrode plate, while the other electrode plate feed unit is disposed on the other side so as to feed the electrode plate to be the positive electrode plate.

4. The stacked cell manufacturing device according to claim 3, wherein
the folding unit includes an imaging unit for checking that takes an image of the table for stacking on which the electrode plate is placed, and
after the cutting process is finished, the control unit moves the separator holding unit out of an imaging range of the imaging unit for checking to be on standby.

5. The stacked cell manufacturing device according to claim 1, wherein
the separator feed unit includes a separator conveying unit capable of attaching two separator rolls in which the separator is wound in a roll, so as to convey the separator pulled out from one of the separator rolls to the separator roller, a separator remaining amount detector to detect a remaining amount of the separator roll from which the separator is currently being pulled out, and a connecting unit disposed at a middle part of the separator conveying unit, so as to cut the separator being pulled out from the current separator roll and to connect the separator pulled out from the remaining separator roll to the rear end of the separator currently being conveyed, when the remaining amount of the separator roll detected by the separator remaining amount detector becomes a certain amount or less, and
the control unit controls the connecting unit to connect the separators so that a joint part of the separators does not reach the stacked cell, when stacking of the stacked cell that is currently being stacked is finished.

6. The stacked cell manufacturing device according to claim 5, wherein after the separators are connected by the connecting unit, and after the completed stacked cell is removed, the control unit performs a joint part ejection process including stopping operation of the electrode feed unit, driving the separator feed unit and the folding unit until the bellows-shaped separator on the table for stacking includes the joint part, controlling the separator cutting unit to cut the separator while holding the separator with the separator holding unit, and ejecting a separator folded body formed on the table for stacking.

* * * * *